(12) United States Patent
Ketchum et al.

(10) Patent No.: US 7,986,742 B2
(45) Date of Patent: Jul. 26, 2011

(54) PILOTS FOR MIMO COMMUNICATION SYSTEM

(75) Inventors: John W. Ketchum, Harvard, MA (US); Mark S. Wallace, Bedford, MA (US); J. Rodney Walton, Carlisle, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1413 days.

(21) Appl. No.: 10/610,446

(22) Filed: Jun. 30, 2003

(65) Prior Publication Data

US 2004/0179627 A1 Sep. 16, 2004

Related U.S. Application Data

(60) Provisional application No. 60/421,309, filed on Oct. 25, 2002, provisional application No. 60/421,462, filed on Oct. 25, 2002, provisional application No. 60/421,428, filed on Oct. 25, 2002, provisional application No. 60/432,617, filed on Dec. 10, 2002, provisional application No. 60/438,601, filed on Jan. 7, 2003.

(51) Int. Cl.
*H04B 7/02* (2006.01)
(52) U.S. Cl. ........................................ 375/267
(58) Field of Classification Search .................. 375/259, 375/260, 267, 219, 295, 299, 347
See application file for complete search history.

(56) References Cited

U.S. PATENT DOCUMENTS

| | | | |
|---|---|---|---|
| 4,750,198 A | 6/1988 | Harper | |
| 4,797,879 A | 1/1989 | Habbab et al. | |
| 5,241,544 A * | 8/1993 | Jasper et al. | 370/478 |
| 5,295,159 A | 3/1994 | Kerpez | |
| 5,404,355 A | 4/1995 | Raith | |
| 5,471,647 A | 11/1995 | Gerlach et al. | |
| 5,506,861 A | 4/1996 | Bottomley | |
| 5,509,003 A | 4/1996 | Snijders et al. | |

(Continued)

FOREIGN PATENT DOCUMENTS

AU 2002259221 11/2002

(Continued)

OTHER PUBLICATIONS

U.S. Appl. No. 60/421,309, filed Oct. 25, 2002 by Qualcomm Incorporated.

(Continued)

*Primary Examiner* — Kevin M Burd
(74) *Attorney, Agent, or Firm* — Thien T. Nguyen; Kenyon S. Jenckes

(57) ABSTRACT

Pilots suitable for use in MIMO systems and capable of supporting various functions are described. The various types of pilot include—a beacon pilot, a MIMO pilot, a steered reference or steered pilot, and a carrier pilot. The beacon pilot is transmitted from all transmit antennas and may be used for timing and frequency acquisition. The MIMO pilot is transmitted from all transmit antennas but is covered with different orthogonal codes assigned to the transmit antennas. The MIMO pilot may be used for channel estimation. The steered reference is transmitted on specific eigenmodes of a MIMO channel and is user terminal specific. The steered reference may be used for channel estimation. The carrier pilot may be transmitted on designated subbands/antennas and may be used for phase tracking of a carrier signal. Various pilot transmission schemes may be devised based on different combinations of these various types of pilot.

3 Claims, 9 Drawing Sheets

U.S. PATENT DOCUMENTS

| | | | |
|---|---|---|---|
| 5,606,729 A | 2/1997 | D'Amico et al. | |
| 5,638,369 A | 6/1997 | Ayerst et al. | |
| 5,677,909 A | 10/1997 | Heide | |
| 5,729,542 A | 3/1998 | Dupont | |
| 5,818,813 A | 10/1998 | Saito et al. | |
| 5,832,387 A | 11/1998 | Bae et al. | |
| 5,867,478 A | 2/1999 | Baum et al. | |
| 5,867,539 A | 2/1999 | Koslov | |
| 5,886,988 A | 3/1999 | Yun et al. | |
| 5,959,965 A | 9/1999 | Ohkubo et al. | |
| 5,973,638 A | 10/1999 | Robbins et al. | |
| 5,982,327 A | 11/1999 | Vook et al. | |
| 6,049,548 A | 4/2000 | Bruno et al. | |
| 6,084,915 A | 7/2000 | Williams | |
| 6,097,771 A | 8/2000 | Foschini | |
| 6,115,354 A | 9/2000 | Weck | |
| 6,131,016 A | 10/2000 | Greenstein et al. | |
| 6,141,388 A | 10/2000 | Servais et al. | |
| 6,141,542 A | 10/2000 | Kotzin et al. | |
| 6,141,567 A | 10/2000 | Youssefmir et al. | |
| 6,144,711 A | 11/2000 | Raleigh et al. | |
| 6,163,296 A | 12/2000 | Lier et al. | |
| 6,167,031 A | 12/2000 | Olofsson et al. | |
| 6,178,196 B1 | 1/2001 | Naguib et al. | |
| 6,232,918 B1 | 5/2001 | Wax et al. | |
| 6,266,528 B1 | 7/2001 | Farzaneh | |
| 6,278,726 B1 | 8/2001 | Mesecher et al. | |
| 6,292,917 B1 | 9/2001 | Sinha et al. | |
| 6,298,035 B1 | 10/2001 | Heiskala | |
| 6,298,092 B1 | 10/2001 | Heath, Jr. et al. | |
| 6,308,080 B1 | 10/2001 | Burt et al. | |
| 6,314,113 B1 | 11/2001 | Guemas | |
| 6,314,289 B1 | 11/2001 | Eberlein et al. | |
| 6,317,612 B1 | 11/2001 | Farsakh | |
| 6,330,293 B1 | 12/2001 | Klank et al. | |
| 6,330,462 B1 | 12/2001 | Chen | |
| 6,333,953 B1 | 12/2001 | Bottomley et al. | |
| 6,339,399 B1 | 1/2002 | Andersson et al. | |
| 6,345,036 B1 | 2/2002 | Sudo et al. | |
| 6,346,910 B1 | 2/2002 | Ito | |
| 6,348,036 B1 | 2/2002 | Looney et al. | |
| 6,351,499 B1 | 2/2002 | Paulraj et al. | |
| 6,363,267 B1 | 3/2002 | Lindskog et al. | |
| 6,377,812 B1 | 4/2002 | Rashid-Farrokhi et al. | |
| 6,385,264 B1 | 5/2002 | Terasawa et al. | |
| 6,452,981 B1 | 9/2002 | Raleigh et al. | |
| 6,473,467 B1 | 10/2002 | Wallace et al. | |
| 6,492,942 B1 | 12/2002 | Kezys | |
| 6,532,225 B1 | 3/2003 | Chang et al. | |
| 6,532,255 B1 | 3/2003 | Gunzelmann et al. | |
| 6,532,562 B1 | 3/2003 | Chou et al. | |
| 6,545,997 B1 | 4/2003 | Bohnke et al. | |
| 6,574,211 B2 | 6/2003 | Padovani et al. | |
| 6,574,271 B2 | 6/2003 | Mesecher et al. | |
| 6,594,473 B1 | 7/2003 | Dabak et al. | |
| 6,594,798 B1 | 7/2003 | Chou et al. | |
| 6,597,682 B1 | 7/2003 | Kari | |
| 6,608,874 B1 | 8/2003 | Beidas et al. | |
| 6,611,231 B2 | 8/2003 | Crilly, Jr. et al. | |
| 6,615,024 B1 | 9/2003 | Boros et al. | |
| 6,636,568 B2 | 10/2003 | Kadous | |
| 6,654,590 B2 | 11/2003 | Boros et al. | |
| 6,654,613 B1 | 11/2003 | Maeng et al. | |
| 6,668,161 B2 | 12/2003 | Boros et al. | |
| 6,683,916 B1 | 1/2004 | Sartori et al. | |
| 6,690,660 B2 | 2/2004 | Kim et al. | |
| 6,693,992 B2 | 2/2004 | Jones et al. | |
| 6,697,346 B1 | 2/2004 | Halton et al. | |
| 6,728,233 B1 | 4/2004 | Park et al. | |
| 6,731,668 B2 | 5/2004 | Ketchum | |
| 6,735,188 B1 | 5/2004 | Becker et al. | |
| 6,738,020 B1 | 5/2004 | Lindskog et al. | |
| 6,751,187 B2 | 6/2004 | Walton et al. | |
| 6,751,444 B1 | 6/2004 | Meiyappan | |
| 6,751,480 B2 | 6/2004 | Kogiantis et al. | |
| 6,760,313 B1 | 7/2004 | Sindhushayana et al. | |
| 6,760,882 B1 | 7/2004 | Gesbert et al. | |
| 6,771,706 B2 | 8/2004 | Ling et al. | |
| 6,785,341 B2 | 8/2004 | Walton et al. | |
| 6,785,513 B1 | 8/2004 | Sivaprakasam | |
| 6,788,948 B2 | 9/2004 | Lindskog et al. | |
| 6,792,041 B1 | 9/2004 | Kim et al. | |
| 6,795,424 B1 | 9/2004 | Kapoor et al. | |
| 6,801,790 B2 | 10/2004 | Rudrapatna | |
| 6,802,035 B2 | 10/2004 | Catreux et al. | |
| 6,847,828 B2 | 1/2005 | Miyoshi et al. | |
| 6,850,498 B2 | 2/2005 | Heath et al. | |
| 6,859,503 B2 | 2/2005 | Pautler et al. | |
| 6,862,271 B2 | 3/2005 | Medvedev et al. | |
| 6,862,440 B2 | 3/2005 | Sampath | |
| 6,868,079 B1 | 3/2005 | Hunt | |
| 6,873,651 B2 | 3/2005 | Tesfai et al. | |
| 6,879,578 B2 | 4/2005 | Pan et al. | |
| 6,879,579 B1 | 4/2005 | Myles et al. | |
| 6,885,708 B2 | 4/2005 | Thomas et al. | |
| 6,888,809 B1 | 5/2005 | Foschini et al. | |
| 6,888,899 B2 | 5/2005 | Raleigh et al. | |
| 6,920,192 B1 | 7/2005 | Laroia et al. | |
| 6,920,194 B2 | 7/2005 | Stopler et al. | |
| 6,937,592 B1 | 8/2005 | Heath, Jr. et al. | |
| 6,940,917 B2 | 9/2005 | Menon et al. | |
| 6,950,632 B1 | 9/2005 | Yun et al. | |
| 6,952,426 B2 | 10/2005 | Wu et al. | |
| 6,956,813 B2 | 10/2005 | Fukuda | |
| 6,956,906 B2 | 10/2005 | Tager et al. | |
| 6,963,742 B2 | 11/2005 | Boros et al. | |
| 6,965,762 B2 | 11/2005 | Sugar et al. | |
| 6,980,800 B2 | 12/2005 | Noerpel et al. | |
| 6,985,434 B2 | 1/2006 | Wu et al. | |
| 6,987,819 B2 | 1/2006 | Thomas et al. | |
| 6,990,059 B1 | 1/2006 | Anikhindi et al. | |
| 6,992,972 B2 | 1/2006 | Van Nee | |
| 6,996,380 B2 | 2/2006 | Dent | |
| 7,006,464 B1 | 2/2006 | Gopalakrishnan et al. | |
| 7,006,483 B2 | 2/2006 | Nelson, Jr. et al. | |
| 7,009,931 B2 | 3/2006 | Ma et al. | |
| 7,012,978 B2 | 3/2006 | Talwar | |
| 7,020,110 B2 | 3/2006 | Walton et al. | |
| 7,020,482 B2 | 3/2006 | Medvedev et al. | |
| 7,020,490 B2 | 3/2006 | Khatri | |
| 7,023,826 B2 | 4/2006 | Sjoberg et al. | |
| 7,031,671 B2 | 4/2006 | Mottier | |
| 7,035,359 B2 | 4/2006 | Molnar | |
| 7,062,294 B1 | 6/2006 | Rogard et al. | |
| 7,068,628 B2 | 6/2006 | Li et al. | |
| 7,072,381 B2 | 7/2006 | Atarashi et al. | |
| 7,072,410 B1 | 7/2006 | Monsen | |
| 7,072,413 B2 | 7/2006 | Walton et al. | |
| 7,088,671 B1 | 8/2006 | Monsen | |
| 7,095,709 B2 | 8/2006 | Walton et al. | |
| 7,099,377 B2 | 8/2006 | Berens et al. | |
| 7,103,325 B1 | 9/2006 | Jia et al. | |
| 7,110,378 B2 | 9/2006 | Onggosanusi et al. | |
| 7,110,463 B2 | 9/2006 | Wallace et al. | |
| 7,113,499 B2 | 9/2006 | Nafie et al. | |
| 7,116,652 B2 | 10/2006 | Lozano | |
| 7,120,199 B2 | 10/2006 | Thielecke et al. | |
| 7,133,459 B2 | 11/2006 | Onggosanusi et al. | |
| 7,149,239 B2 | 12/2006 | Hudson | |
| 7,149,254 B2 | 12/2006 | Sampath | |
| 7,155,171 B2 | 12/2006 | Ebert et al. | |
| 7,158,563 B2 | 1/2007 | Ginis et al. | |
| 7,164,669 B2 | 1/2007 | Li et al. | |
| 7,187,646 B2 | 3/2007 | Schramm | |
| 7,190,749 B2 | 3/2007 | Levin et al. | |
| 7,194,237 B2 | 3/2007 | Sugar et al. | |
| 7,197,084 B2 | 3/2007 | Ketchum et al. | |
| 7,200,404 B2 | 4/2007 | Panasik et al. | |
| 7,206,354 B2 | 4/2007 | Wallace et al. | |
| 7,218,684 B2 | 5/2007 | Bolourchi et al. | |
| 7,224,704 B2 | 5/2007 | Lu et al. | |
| 7,231,184 B2 | 6/2007 | Eilts et al. | |
| 7,233,625 B2 | 6/2007 | Ma et al. | |
| 7,238,508 B2 | 7/2007 | Lin et al. | |
| 7,242,727 B2 | 7/2007 | Liu et al. | |
| 7,248,638 B1 | 7/2007 | Banister | |
| 7,248,841 B2 | 7/2007 | Agee et al. | |

| | | |
|---|---|---|
| 7,254,171 B2 | 8/2007 | Hudson |
| 7,260,153 B2 | 8/2007 | Nissani |
| 7,260,366 B2 | 8/2007 | Lee et al. |
| 7,263,119 B1 | 8/2007 | Hsu et al. |
| 7,280,625 B2 | 10/2007 | Ketchum et al. |
| 7,283,508 B2 | 10/2007 | Choi et al. |
| 7,292,854 B2 | 11/2007 | Das et al. |
| 7,298,778 B2 | 11/2007 | Visoz et al. |
| 7,308,035 B2 | 12/2007 | Rouquette et al. |
| 7,317,750 B2 | 1/2008 | Shattil |
| 7,324,429 B2 | 1/2008 | Walton et al. |
| 7,327,800 B2 | 2/2008 | Oprea et al. |
| 7,342,912 B1 | 3/2008 | Kerr et al. |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 | 11/2008 | Lee et al. |
| 7,480,278 B2 | 1/2009 | Pedersen et al. |
| 7,492,737 B1 | 2/2009 | Fong et al. |
| 7,548,506 B2 | 6/2009 | Ma et al. |
| 7,551,546 B2 | 6/2009 | Ma et al. |
| 7,551,580 B2 | 6/2009 | du Crest et al. |
| 7,573,805 B2 | 8/2009 | Zhuang et al. |
| 7,606,296 B1 | 10/2009 | Hsu et al. |
| 7,636,573 B2 | 12/2009 | Walton et al. |
| 7,653,415 B2 | 1/2010 | Van Rooyen |
| 2001/0031621 A1 | 10/2001 | Schmutz |
| 2001/0046205 A1 | 11/2001 | Easton et al. |
| 2002/0003774 A1 | 1/2002 | Wang et al. |
| 2002/0018310 A1 | 2/2002 | Hung |
| 2002/0018453 A1 | 2/2002 | Yu et al. |
| 2002/0034263 A1* | 3/2002 | Schmidl et al. ............ 375/299 |
| 2002/0041635 A1 | 4/2002 | Ma et al. |
| 2002/0044591 A1 | 4/2002 | Lee et al. |
| 2002/0057659 A1 | 5/2002 | Ozluturk et al. |
| 2002/0064214 A1 | 5/2002 | Hattori et al. |
| 2002/0080735 A1 | 6/2002 | Heath et al. |
| 2002/0085620 A1 | 7/2002 | Mesecher |
| 2002/0085641 A1* | 7/2002 | Baum ............ 375/260 |
| 2002/0098872 A1 | 7/2002 | Judson |
| 2002/0105928 A1 | 8/2002 | Kapoor et al. |
| 2002/0115473 A1* | 8/2002 | Hwang et al. ............ 455/562 |
| 2002/0122381 A1 | 9/2002 | Wu et al. |
| 2002/0122393 A1 | 9/2002 | Caldwell et al. |
| 2002/0147953 A1 | 10/2002 | Catreux et al. |
| 2002/0154705 A1 | 10/2002 | Walton et al. |
| 2002/0181390 A1 | 12/2002 | Mody et al. |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 | 12/2002 | Onggosanusi et al. |
| 2003/0002450 A1* | 1/2003 | Jalali et al. ............ 370/294 |
| 2003/0012308 A1 | 1/2003 | Sampath et al. |
| 2003/0048856 A1 | 3/2003 | Ketchum et al. |
| 2003/0078024 A1 | 4/2003 | Magee et al. |
| 2003/0095197 A1 | 5/2003 | Wheeler et al. |
| 2003/0099306 A1 | 5/2003 | Nilsson et al. |
| 2003/0108117 A1 | 6/2003 | Ketchum et al. |
| 2003/0112745 A1 | 6/2003 | Zhuang et al. |
| 2003/0119452 A1 | 6/2003 | Kim et al. |
| 2003/0123389 A1 | 7/2003 | Russell et al. |
| 2003/0125040 A1 | 7/2003 | Walton et al. |
| 2003/0128656 A1 | 7/2003 | Scarpa |
| 2003/0139194 A1 | 7/2003 | Onggosanusi et al. |
| 2003/0153360 A1* | 8/2003 | Burke et al. ............ 455/562 |
| 2003/0157954 A1 | 8/2003 | Medvedev et al. |
| 2003/0162519 A1 | 8/2003 | Smith et al. |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0235149 A1 | 12/2003 | Chan et al. |
| 2003/0235255 A1 | 12/2003 | Ketchum et al. |
| 2004/0037257 A1 | 2/2004 | Ngo |
| 2004/0042556 A1 | 3/2004 | Medvedev et al. |
| 2004/0047292 A1 | 3/2004 | Du Crest et al. |
| 2004/0052228 A1 | 3/2004 | Tellado et al. |
| 2004/0071104 A1 | 4/2004 | Boesel et al. |
| 2004/0082356 A1 | 4/2004 | Walton et al. |
| 2004/0085939 A1 | 5/2004 | Wallace et al. |
| 2004/0087324 A1 | 5/2004 | Ketchum et al. |
| 2004/0136349 A1 | 7/2004 | Walton et al. |
| 2004/0156328 A1 | 8/2004 | Walton et al. |
| 2004/0160987 A1 | 8/2004 | Sudo et al. |
| 2004/0176097 A1 | 9/2004 | Wilson et al. |
| 2004/0198276 A1 | 10/2004 | Tellado et al. |
| 2004/0203853 A1 | 10/2004 | Sheynblat |
| 2005/0047384 A1 | 3/2005 | Wax et al. |
| 2005/0111599 A1 | 5/2005 | Walton et al. |
| 2005/0120097 A1 | 6/2005 | Walton et al. |
| 2005/0128953 A1 | 6/2005 | Wallace et al. |
| 2005/0208959 A1 | 9/2005 | Chen et al. |
| 2006/0077935 A1 | 4/2006 | Hamalainen et al. |
| 2006/0104196 A1 | 5/2006 | Wu et al. |
| 2006/0183497 A1 | 8/2006 | Paranchych et al. |
| 2007/0177681 A1 | 8/2007 | Choi et al. |
| 2008/0285488 A1 | 11/2008 | Walton et al. |
| 2008/0285669 A1 | 11/2008 | Walton et al. |
| 2008/0285670 A1 | 11/2008 | Walton et al. |
| 2010/0142636 A1 | 6/2010 | Heath, Jr. et al. |

FOREIGN PATENT DOCUMENTS

| | | |
|---|---|---|
| CA | 2690247 | 10/2001 |
| CN | 1086061 | 4/1994 |
| CN | 1308794 | 8/2001 |
| CN | 1489836 A | 4/2004 |
| DE | 19951525 A1 | 6/2001 |
| EP | 0755090 A1 | 1/1997 |
| EP | 0762701 A2 | 3/1997 |
| EP | 0772329 | 5/1997 |
| EP | 0805568 A1 | 11/1997 |
| EP | 0895387 | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1133070 | 9/2001 |
| EP | 1143754 | 10/2001 |
| EP | 1 175 022 A2 | 1/2002 |
| EP | 1170879 A1 | 1/2002 |
| EP | 1182799 A2 | 2/2002 |
| EP | 1 185 048 A2 | 3/2002 |
| EP | 1185001 | 3/2002 |
| EP | 1185015 | 3/2002 |
| EP | 1207635 A1 | 5/2002 |
| EP | 1207645 A1 | 5/2002 |
| EP | 1223702 A1 | 7/2002 |
| EP | 1241824 A1 | 9/2002 |
| EP | 1265411 | 12/2002 |
| EP | 1315311 A1 | 5/2003 |
| EP | 1379020 | 1/2004 |
| EP | 1387545 A2 | 2/2004 |
| EP | 1556984 A2 | 7/2005 |
| GB | 2300337 A | 10/1996 |
| GB | 2373973 A | 10/2002 |
| JP | 1132027 | 5/1989 |
| JP | 03104430 | 5/1991 |
| JP | 6501139 T | 1/1994 |
| JP | 8274756 | 10/1996 |
| JP | 9135230 | 5/1997 |
| JP | 9266466 A | 10/1997 |
| JP | 9307526 A | 11/1997 |
| JP | 09327073 | 12/1997 |
| JP | 9512156 | 12/1997 |
| JP | 1028077 | 1/1998 |
| JP | 10084324 | 3/1998 |
| JP | 10209956 A | 8/1998 |
| JP | 10327126 | 12/1998 |
| JP | 1141159 | 2/1999 |
| JP | 11069431 A | 3/1999 |
| JP | 11074863 A | 3/1999 |
| JP | 11163823 A | 6/1999 |
| JP | 11205273 | 7/1999 |

| | | |
|---|---|---|
| JP | 11252037 A | 9/1999 |
| JP | 2991167 | 12/1999 |
| JP | 2000092009 A | 3/2000 |
| JP | 2001044930 A | 2/2001 |
| JP | 200186045 | 3/2001 |
| JP | 2001186051 A | 7/2001 |
| JP | 2001217896 | 8/2001 |
| JP | 2001231074 | 8/2001 |
| JP | 2001237751 A | 8/2001 |
| JP | 200264879 | 2/2002 |
| JP | 200277098 | 3/2002 |
| JP | 200277104 | 3/2002 |
| JP | 2002111627 | 4/2002 |
| JP | 2002164814 | 6/2002 |
| JP | 2002176379 | 6/2002 |
| JP | 2002204217 | 7/2002 |
| JP | 2003504941 | 2/2003 |
| JP | 2003530010 | 10/2003 |
| KR | 1020020003370 | 1/2002 |
| KR | 20060095576 A | 8/2006 |
| RU | 2015281 C1 | 6/1994 |
| RU | 2141168 C1 | 11/1999 |
| RU | 2149509 | 5/2000 |
| RU | 2152132 | 6/2000 |
| RU | 2157592 | 10/2000 |
| RU | 2158479 C2 | 10/2000 |
| RU | 2168278 | 5/2001 |
| RU | 2201034 C2 | 3/2003 |
| RU | 2335852 C2 | 10/2008 |
| TW | 419912 | 1/2001 |
| WO | WO9530316 A1 | 11/1995 |
| WO | WO9532567 A1 | 11/1995 |
| WO | WO9622662 A1 | 7/1996 |
| WO | WO96035268 | 11/1996 |
| WO | WO9719525 A1 | 5/1997 |
| WO | WO9809381 | 3/1998 |
| WO | WO9809395 | 3/1998 |
| WO | WO9824192 A1 | 6/1998 |
| WO | WO9826523 | 6/1998 |
| WO | WO9830047 | 7/1998 |
| WO | WO9903224 A1 | 1/1999 |
| WO | WO9916214 | 4/1999 |
| WO | WO9944379 A1 | 9/1999 |
| WO | WO9957820 | 11/1999 |
| WO | WO0011823 A1 | 3/2000 |
| WO | WO0036764 A2 | 6/2000 |
| WO | WO00062456 | 10/2000 |
| WO | WO0105067 A1 | 1/2001 |
| WO | WO 01/09114 A1 | 2/2001 |
| WO | WO0126269 | 4/2001 |
| WO | WO0169801 | 9/2001 |
| WO | WO0171928 | 9/2001 |
| WO | WO0176110 | 10/2001 |
| WO | WO0180510 A1 | 10/2001 |
| WO | WO0182521 A2 | 11/2001 |
| WO | WO 01/97400 A2 | 12/2001 |
| WO | WO 02/01732 A2 | 1/2002 |
| WO | WO 02/01732 A3 | 1/2002 |
| WO | WO0203557 | 1/2002 |
| WO | WO 02/15433 A1 | 2/2002 |
| WO | WO0225853 A2 | 3/2002 |
| WO | WO 02/060138 A2 | 8/2002 |
| WO | WO02062002 A1 | 8/2002 |
| WO | WO02065664 A2 | 8/2002 |
| WO | WO02069523 A1 | 9/2002 |
| WO | WO02069590 A1 | 9/2002 |
| WO | WO02073869 A1 | 9/2002 |
| WO | WO02078211 A2 | 10/2002 |
| WO | WO02082689 A2 | 10/2002 |
| WO | WO02088656 | 11/2002 |
| WO | WO02099992 A1 | 12/2002 |
| WO | WO03010984 A1 | 2/2003 |
| WO | WO03028153 A1 | 4/2003 |
| WO | WO03034646 A2 | 4/2003 |
| WO | WO03047140 A1 | 6/2003 |
| WO | WO2004002011 | 12/2003 |
| WO | WO2004002047 | 12/2003 |
| WO | WO2004039011 A2 | 5/2004 |
| WO | WO2004039022 | 5/2004 |

OTHER PUBLICATIONS

U.S. Appl. No. 60/421,428, filed Oct. 25, 2002 by Qualcomm Incorporated.
"3GPP2 TIA/EIA/IS-2000-2-A,""Physical Layer Standard for cdma2000 Spread Spectrum System"",(Nov. 19, 1999)".
International Search Report—PCT/US03/034520, International Search Authority—European Patent Office, Jun. 11, 2004.
Alamouti, S.M., "A Simple Transmit Diversity Technique for Wireless Communications," IEEE Journal on Select Areas in Communications, vol. 16, No. 8, Oct. 1998, pp. 1451-1458.
B. Hassibi, et al. "High-Rate Codes that are Linear in Space and Time," LUCENT Technologies, Murray Hill, NY (USA), Aug. 22, 2000, (pp. 1-54).
Chen, K.C. et al., "Novel Space-Time Processing of DS/CDMA Multipath Signal," IEEE 49th, Vehicular Technology Conference, Houston, Texas, May 16-20, 1999, pp. 1809-1813.
Choi, R. et al., "MIMO Transmit Optimization for Wireless Communication Systems," Proceedings of the First IEEE International workshops on Electronic Design, pp. 1-6, Piscataway, New Jersey, Jan. 29-31 (2002).
ETSI TS 101 761-1 v1.3.1, Broadband Radio Access Networks (BRAN); HIPERLAN.
Fujii, M.: "Pseudo-Orthogonal Multibeam-Time Transmit Diversity for OFDM-CDMA" pp. 222-226 (2002).
Gao, et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, Sep. 24-28, 2002, IEEE Vehicular Technology Con.
Haustein, T. et al.: "Performance of MIMO Systems with Channel Inversion," IEEE 55th Vehicular Technology Conference, Birmingham, Alabama, May 6-9 (2002), pp. 35-39.
Hayashi, K, "A New Spatio-Temporal Equalization Method Based on Estimated Channel Response", Sep. 2001, IEEE Transaction on Vehicular Technology, vol. 50, Issue 5, pp. 1250-1259.
Hong, D. K. et al.: "Robust Frequency Offset Estimation for Pilot Symbol Assisted Packet CDMA with MIMO Antenna Systems," IEEE Communications Letters, vol. 6, No. 6, pp. 262-264 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.
Bingham, "Multicarrier Modulation for Data Transmission: An Idea Whose Time Has Come," IEEE Communications Magazines, May 1990 (pp. 5-13).
Jongren et al., "Utilizing Quantized Feedback Information in Orthogonal Space-Time Block Coding," 2000 IEEE Global Telecommunications Conference, 2(4): 995-999, Nov. 27, 2000.
Kiessling, et al., "Short-Term and Long Term Diagonalization of Correlated MIMO Channels with Adaptive Modulation," IEEE Conference, vol. 2, (Sep. 15, 2002), pp. 593597.
L. Deneire, et al. "A Low Complexity ML Channel Estimator for OFDM,".
Li Lihua, et al., "A Practical Space-Frequency Block Coded OFDM Scheme for Fast Fading Broadband Channels" 13th IEEE International Symposium on Personal Indoor and Mobile Radio Communications. PIMRC 2002. Sep. 15-18, 2002, pp. 212-216, vol. 1, XP002280831.
M.A. Kousa, et al., "Multichannel adaptive system," IEE Proceedings-I, vol. 140, No. 5, Oct. 1993, pp. 357-364.
Miyashita, et al., "High Data-Rate Transmission with Eigenbeam-Space Division Multiplexing (E-SDM) in a MIMO Channel," VTC 2002-Fall. 2002 IEEE 56th. Vehicular Technology Conference Proceedings. Vancouver, Canada, Sep. 24-28, 2002, IEEE Vehicular Technology.

P.W. Wolniansky, et al. "V-BLAST: An Architecture for Realizing Very High Data Rates Over the Rich-Scattering Wireless Channel," LUCENT Technologies, Holmdel, NJ.

Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11 (2001), pp. 1508-1512.

Tarighat, A. et al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.

Theon, S. et al.: "Improved Adaptive Downlink for OFDM/SDMA-Based Wireless Networks," IEEE VTS 53rd Vehicular Technology Conference, pp. 707-711, Rhodes, Greece, May 6-9, (2001).

Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinky, Finland, Jun. 11-14 (2001).

Van Zelst, A. et al.: "Space Division Multiplexing (SDM) for OFDM Systems," IEEE 51st Vehicular Technology Conference Proceedings, pp. 1070-1074, Tokyo, Japan, May 15-18 (2000).

Warner, W. et al.: OFDM/FM Frame Synchronization for Mobile Radio Data.

S.W. Wales, A MIMO technique within the UTRA TDD standard Jun. 22, 2005.

Diggavi, S. et al., "intercarrier interference in MIMO OFDM," IEEE International Conference on Communications, 2002, vol. 1, 485-489.

ETSI TS 101 761-1 v1.3.1, "Broadband Radio Access Networks (BRAN); HIPERLAN Type 2; Data Link Control (DLC) Layer; Part 1: Basic Data Transport Functions," ETSI Standards, European Telecommunications Standards Institute BR (V131), pp. 1-88 (Dec. 2001).

Iserte et al., "Joint beamforming strategies in OFDM-MIMO Systems," 2002, sections 2 and 3, Department of Signal Theory and Communications.

L. Deneire, et al. "A Low Complexity ML Channel Estimator for OFDM," Proc IEEE ICC Jun. 2001 pp. 1461-1465.

Lebrun G., et al., "MIMO transmission over a time varying TDD channel using SVD," Electronics Letters, 2001, vol. 37, 1363-1364.

Li et al., "Simplified Channel Estimation for OFDM Systems with Multiple Transmit Antennas," IEEE Transactions on Wireless Communications, Jan. 2002, vol. 1, No. 1, 67-75.

Sampath H., et al., "Joint transmit and receive optimization for high data rate wireless communication using multiple antennas, XP010373976," 2002, 215-219.

Warner, W. et al.: "OFDM/FM Frame Synchronization for Mobile Radio Data Communication", IEEE Transactions on Vehicular Technology, Aug. 1993, vol. 42, No. 3, pp. 302-313.

Wong K. K., et al., "Optimizing time and space MIMO antenna system for frequency selective fading channels," 2001, Sections II and III and V, 1396.

Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.

Chung, J. et al: "Multiple antenna systems for 802.16 systems." IEEE 802.16 Broadband Wireless Access Working Group <http://ieee802.org/I6>, IEEE 802.16abc-01/31, Sep. 7, 2001.

European Search Report—EP08012143.7, Search Authority—Munich Patent Office, Jan. 19, 2011.

Gore D. A., et al: "Selecting an optimal set of transmit antennas for a low rank matrix channel," 2000 IEEE International Conference on Acoustics, Speech, and Signal Processing. Proceedings. (ICASSP). Istanbul, Turkey, Jun. 5-9, 2000, New York, NY; IEEE, US, vol. 5 of 6, Jun. 5, 2000 (Jul. 5, 2000), pp. 2785-2788, XP001035763, abstract.

Hong, D. K. et al.: "Robust Frequency Offset Estimation for Pilot Symbol Assisted Packet CDMA with MIMO Antenna Systems," IEEE Communications Letters, vol. 6, No. 6, pp. 262-264, XP-001133262 (Jun. 2002).

The Authoritative Dictionary of IEEE Standards Terms, Seventh Edition, IEEE Press: New York (Dec. 2000), p. 902.

Wong, Cheong. et al., "Multiuser OFDM with Adaptive Subcarrier, Bit and Power Allocation," Oct. 1999, IEEE Journal on Selected Areas in Communications, vol. 17, No. 10, pp. 1747-1758.

European Search Report—EP10173988—Search Authority—Munich—Mar. 15, 2011.

Translation of Office Action in Canadian Application 2501634 corresponding to U.S. Appl. No. 10/610,446, citing CA2690247 dated Feb. 25, 2011.

Translation of Office Action in Japanese Application 2005-501686 corresponding to U.S. Appl. No. 10/375,162, citing JP09135230 dated Feb. 15, 2011.

* cited by examiner

PILOTS FOR MIMO COMMUNICATION SYSTEM

This application claims the benefit of provisional U.S. Application Ser. No. 60/421,309, entitled "MIMO WLAN System," filed on Oct. 25, 2002, Ser. No. 60/421,462, entitled "Channel Calibration for a Time Division Duplexed Communication System," filed on Oct. 25, 2002, Ser. No. 60/421,428, entitled "Channel Estimation and Spatial Processing for TDD MIMO Systems," filed on Oct. 25, 2002, Ser. No. 60/432,617, entitled "Pilots for MIMO Communication Systems," filed Dec. 10, 2002, and Ser. No. 60/438,601, entitled "Pilots for MIMO Communication Systems," filed on Jan. 7, 2003, all of which are assigned to the assignee of the present application and incorporated herein by reference in their entirety for all purposes.

BACKGROUND

I. Field

The present invention relates generally to data communication, and more specifically to pilots suitable for use in multiple-input multiple-output (MIMO) communication systems.

II. Background

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as eigenmodes, where $N_S \leq \min\{N_T, N_R\}$. Each of the $N_S$ independent channels corresponds to a dimension. The MIMO system can provide improved performance (e.g., increased transmission capacity and/or greater reliability) if the additional dimensionalities created by the multiple transmit and receive antennas are utilized.

In a wireless communication system, data to be transmitted is first modulated onto a radio frequency (RF) carrier signal to generate an RF modulated signal that is more suitable for transmission over a wireless channel. For a MIMO system, up to $N_T$ RF modulated signals may be generated and transmitted simultaneously from the $N_T$ transmit antennas. The transmitted RF modulated signals may reach the $N_R$ receive antennas via a number of propagation paths in the wireless channel. The characteristics of the propagation paths typically vary over time due to a number of factors such as, for example, fading, multipath, and external interference. Consequently, the transmitted RF modulated signals may experience different channel conditions (e.g., different fading and multipath effects) and may be associated with different complex gains and signal-to-noise ratios (SNRs).

To achieve high performance, it is often necessary to characterize the response of the wireless channel. For example, the channel response may be needed by the transmitter to perform spatial processing (described below) for data transmission to the receiver. The channel response may also be needed by the receiver to perform spatial processing on the received signals to recover the transmitted data.

In many wireless communication systems, a pilot is transmitted by the transmitter to assist the receiver in performing a number of functions. The pilot is typically generated based on known symbols and processed in a known manner. The pilot may be used by the receiver for channel estimation, timing and frequency acquisition, data demodulation, and so on.

Various challenges are encountered in the design of a pilot structure for a MIMO system. As one consideration, the pilot structure needs to address the additional dimensionalities created by the multiple transmit and multiple receive antennas. As another consideration, since pilot transmission represents overhead in the MIMO system, it is desirable to minimize pilot transmission to the extent possible. Moreover, if the MIMO system is a multiple-access system that supports communication with multiple users, then the pilot structure needs to be designed such that the pilots needed to support the multiple users do not consume a large portion of the available system resources.

There is therefore a need in the art for pilots for MIMO systems that address the above considerations.

SUMMARY

Pilots suitable for use in MIMO systems are provided herein. These pilots can support various functions that may be needed for proper system operation, such as timing and frequency acquisition, channel estimation, calibration, and so on. The pilots may be considered as being of different types that are designed and used for different functions.

The various types of pilot may include: a beacon pilot, a MIMO pilot, a steered reference or steered pilot, and a carrier pilot. The beacon pilot is transmitted from all transmit antennas and may be used for timing and frequency acquisition. The MIMO pilot is also transmitted from all transmit antennas but is covered with different orthogonal codes assigned to the transmit antennas. The MIMO pilot may be used for channel estimation. The steered reference is transmitted on specific eigenmodes of a MIMO channel and is user terminal specific. The steered reference may be used for channel estimation and possibly rate control. The carrier pilot may be transmitted on certain designated subbands/antennas and may be used for phase tracking of a carrier signal.

Various pilot transmission schemes may be devised based on different combinations of these various types of pilot. For example, on the downlink, an access point may transmit a beacon pilot, a MIMO pilot, and a carrier pilot for all user terminals within its coverage area and may optionally transmit a steered reference to any active user terminal that is receiving a downlink transmission from the access point. On the uplink, a user terminal may transmit a MIMO pilot for calibration and may transmit a steered reference and a carrier pilot when scheduled (e.g., for downlink and/or uplink data transmissions). The processing to transmit and receive these various types of pilot is described in further detail below.

Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
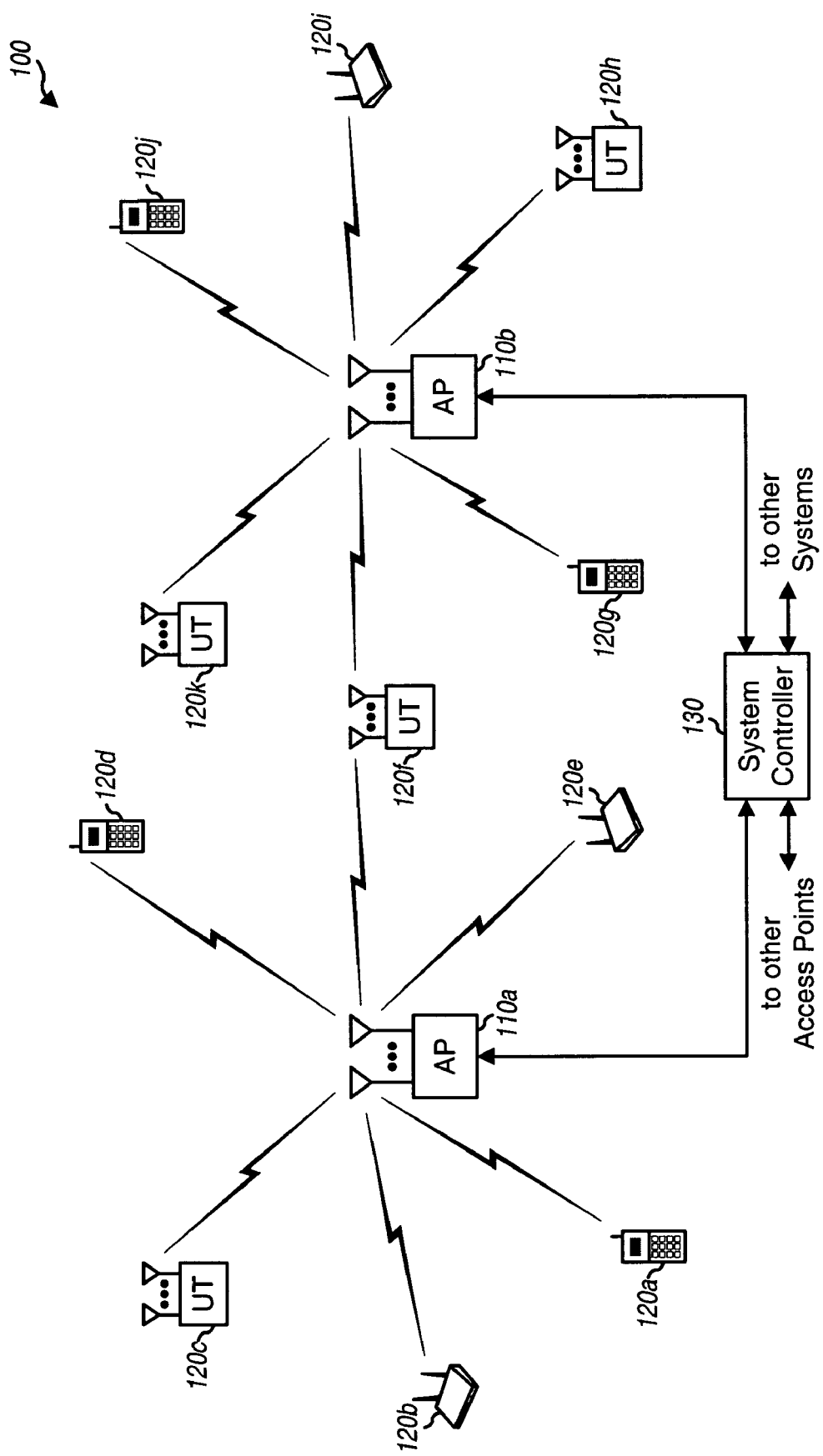
FIG. 1 shows a multiple-access MIMO system.

FIG. 1 shows a multiple-access MIMO system 100 that supports a number of users and is capable of implementing the pilots described herein. MIMO system 100 includes a number of access points (APs) 110 that support communication for a number of user terminals (UTs) 120. For simplicity, only two access points 110a and 110b are shown in FIG. 1. An access point is generally a fixed station that is used for communicating with the user terminals. An access point may also be referred to as a base station or using some other terminology.

User terminals 120 may be dispersed throughout the system. Each user terminal may be a fixed or mobile terminal that can communicate with the access point. A user terminal may also be referred to as an access terminal, a mobile station, a remote station, a user equipment (UE), a wireless device, or some other terminology. Each user terminal may communicate with one or possibly multiple access points on the downlink and/or uplink at any given moment. The downlink (i.e., forward link) refers to transmission from the access point to the user terminal, and the uplink (i.e., reverse link) refers to transmission from the user terminal to the access point. As used herein, an "active" user terminal is one that is receiving a downlink transmission from an access point and/or transmitting an uplink transmission to the access point.

In FIG. 1, access point 110a communicates with user terminals 120a through 120f, and access point 110b communicates with user terminals 120f through 120k. The assignment of user terminals to access points is typically based on received signal strength and not distance. At any given moment, a user terminal may receive downlink transmission from one or multiple access points. A system controller 130 couples to access points 110 and may be designed to perform a number of functions such as (1) coordination and control for the access points coupled to it, (2) routing of data among these access points, and (3) access and control of communication with the user terminals served by these access points.

I. Pilots

Pilots suitable for use in MIMO systems, such as the one shown in FIG. 1, are provided herein. These pilots can support various functions that may be needed for proper system operation, such as timing and frequency acquisition, channel estimation, calibration, and so on. The pilots may be considered as being of different types that are designed and used for different functions. Table 1 lists four types of pilot and their short description for an exemplary pilot design. Fewer, different, and/or additional pilot types may also be defined, and this is within the scope of the invention.

TABLE 1

Pilot Types

| Pilot Type | Description |
|---|---|
| Beacon Pilot | A pilot transmitted from all transmit antennas and used for timing and frequency acquisition. |
| MIMO Pilot | A pilot transmitted from all transmit antennas with different orthogonal codes and used for channel estimation. |
| Steered Reference or Steered Pilot | A pilot transmitted on specific eigenmodes of a MIMO channel for a specific user terminal and used for channel estimation and possibly rate control. |
| Carrier Pilot | A pilot used for phase tracking of a carrier signal. |

Steered reference and steered pilot are synonymous terms.

Various pilot transmission schemes may be devised based on any combination of these various types of pilot. For example, on the downlink, an access point may transmit a beacon pilot, a MIMO pilot, and a carrier pilot for all user terminals within its coverage area and may optionally transmit a steered reference to any active user terminal that is receiving a downlink transmission from the access point. On the uplink, a user terminal may transmit a MIMO pilot for calibration and may transmit a steered reference and a carrier pilot when scheduled (e.g., for downlink and/or uplink data transmissions). The processing to transmit and receive these various types of pilot is described in further detail below.

The pilots described herein may be used for various types of MIMO systems. For example, the pilots may be used for (1) single-carrier MIMO systems, (2) multi-carrier MIMO systems that employ orthogonal frequency division multiplexing (OFDM) or some other multi-carrier modulation technique, (3) MIMO systems that implement multiple-access techniques such as frequency division multiple-access (FDMA), time division multiple-access (TDMA), and code division multiple-access (CDMA), (4) MIMO systems that implement frequency division multiplexing (FDM), time division multiplexing (TDM), and/or code division multiplexing (CDM) for data transmission, (5) MIMO systems that implement time division duplexing (TDD), frequency division duplexing (FDD), and/or code division duplexing (CDD) for the downlink and uplink channels, and (6) other types of MIMO systems. For clarity, the pilots are described below first for a MIMO system that implements OFDM (i.e., a MIMO-OFDM system) and then for a TDD MIMO-OFDM system.

OFDM effectively partitions the overall system bandwidth into a number of ($N_F$) orthogonal subbands, which are also referred to as tones, frequency bins, or frequency subchannels. With OFDM, each subband is associated with a respective subcarrier upon which data may be modulated. For a MIMO-OFDM system, each subband may be associated with a number of eigenmodes, and each eigenmode of each subband may be viewed as an independent transmission channel.

For clarity, a specific pilot structure is described below for an exemplary MIMO-OFDM system. In this MIMO-OFDM system, the system bandwidth is partitioned into 64 orthogonal subbands (i.e., $N_F=64$), which are assigned indices of −32 to +31. Of these 64 subbands, 48 subbands (e.g., with indices of ±{1, . . . , 6, 8, . . . , 20, 22, . . . , 26}) may be used for data transmission, 4 subbands (e.g., with indices of ±{7, 21}) may be used for a carrier pilot and possibly signaling, the DC subband (with index of 0) is not used, and the remaining subbands are also not used and serve as guard subbands. Thus, of the 64 total subbands, the 52 "usable" subbands include the 48 data subbands and 4 pilot subbands, and the remaining 12 subbands are not used. This OFDM subband structure is described in further detail in the aforementioned provisional U.S. Patent Application Ser. No. 60/421,309. Different number of subbands and other OFDM subband structures may also be implemented for the MIMO-OFDM system, and this is within the scope of the invention.

For OFDM, the data to be transmitted on each usable subband is first modulated (i.e., symbol mapped) using a particular modulation scheme (e.g., BPSK, QPSK, or M-QAM) selected for use for that subband. One modulation symbol may be transmitted on each usable subband in each symbol period. Each modulation symbol is a complex value for a specific point in a signal constellation corresponding to the selected modulation scheme. Signal values of zero may be sent on the unused subbands. For each OFDM symbol period, the modulation symbols for the usable subbands and zero signal values for the unused subbands (i.e., the modulation symbols and zeros for all $N_F$ subbands) are transformed to the time domain using an inverse fast Fourier transform (IFFT) to obtain a transformed symbol that comprises $N_F$ time-domain samples. To combat inter-symbol interference (ISI), a portion of each transformed symbol is often repeated (which is also referred to as adding a cyclic prefix) to form a corresponding OFDM symbol, which is then transmitted over the wireless channel. An OFDM symbol period, which is also referred to herein as a symbol period, corresponds to the duration of one OFDM symbol.

1. Beacon Pilot

The beacon pilot includes a specific set of pilot symbols that is transmitted from each of the $N_T$ transmit antennas. The same set of pilot symbols is transmitted for $N_B$ symbol periods designated for beacon pilot transmission. In general, $N_B$ may be any integer value of one or greater.

In an exemplary embodiment, the set of pilot symbols for the beacon pilot is a set of 12 BPSK modulation symbols for 12 specific subbands, which is referred to as a "B" OFDM symbol. The 12 BPSK modulation symbols for the B OFDM symbol are given in Table 2. Signal values of zeros are transmitted on the remaining 52 unused subbands.

TABLE 2

| | Pilot Symbols | |
|---|---|---|
| Subband Index | Beacon Pilot b(k) | MIMO Pilot p(k) |
| . . . | 0 | 0 |
| −26 | 0 | −1 − j |
| −25 | 0 | −1 + j |
| −24 | 1 + j | −1 + j |
| −23 | 0 | −1 + j |
| −22 | 0 | 1 − j |
| −21 | 0 | 1 − j |
| −20 | −1 − j | 1 + j |
| −19 | 0 | −1 − j |
| −18 | 0 | −1 + j |
| −17 | 0 | 1 + j |
| −16 | 1 + j | −1 + j |
| −15 | 0 | 1 − j |
| −14 | 0 | 1 + j |
| −13 | 0 | 1 − j |
| −12 | −1 − j | 1 − j |
| −11 | 0 | −1 − j |
| −10 | 0 | −1 − j |
| −9 | 0 | 1 − j |
| −8 | −1 − j | −1 − j |
| −7 | 0 | 1 + j |
| −6 | 0 | −1 + j |
| −5 | 0 | −1 − j |
| −4 | 1 + j | −1 + j |
| −3 | 0 | −1 + j |
| −2 | 0 | 1 − j |
| −1 | 0 | −1 + j |
| 0 | 0 | 0 |

TABLE 2-continued

| | Pilot Symbols | |
|---|---|---|
| Subband Index | Beacon Pilot b(k) | MIMO Pilot p(k) |
| 1 | 0 | 1 − j |
| 2 | 0 | −1 − j |
| 3 | 0 | −1 − j |
| 4 | −1 − j | −1 − j |
| 5 | 0 | −1 + j |
| 6 | 0 | 1 + j |
| 7 | 0 | −1 − j |
| 8 | −1 − j | −1 + j |
| 9 | 0 | −1 − j |
| 10 | 0 | −1 − j |
| 11 | 0 | 1 + j |
| 12 | 1 + j | 1 − j |
| 13 | 0 | −1 + j |
| 14 | 0 | −1 − j |
| 15 | 0 | 1 + j |
| 16 | 1 + j | −1 + j |
| 17 | 0 | −1 + j |
| 18 | 0 | 1 − j |
| 19 | 0 | 1 + j |
| 20 | 1 + j | −1 + j |
| 21 | 0 | 1 + j |
| 22 | 0 | −1 + j |
| 23 | 0 | 1 + j |
| 24 | 1 + j | −1 + j |
| 25 | 0 | 1 − j |
| 26 | 0 | −1 − j |
| . . . | 0 | 0 |

For the exemplary embodiment and as shown in Table 2, for the beacon pilot, the BPSK modulation symbol (1+j) is transmitted in subbands −24, −16, −4, 12, 16, 20, and 24, and the BPSK modulation symbol −(1+j) is transmitted in subbands −20, −12, −8, 4, and 8. Zero signal values are transmitted on the remaining 52 subbands for the beacon pilot.

The B OFDM symbol is designed to facilitate system timing and frequency acquisition by the user terminals. For the exemplary embodiment of the B OFDM symbol described above, only 12 of the 64 total subbands are used, and these subbands are spaced apart by four subbands. This 4-subband spacing allows the user terminal to have an initial frequency error of up to two subbands. The beacon pilot allows the user terminal to correct for its initial coarse frequency error, and to correct its frequency so that the phase drift over the duration of the beacon pilot is small (e.g., less than 45 degrees over the beacon pilot duration at a sample rate of 20 MHz). If the beacon pilot duration is 8 µsec, then the 45 degrees (or less) of phase drift over 8 µsec is equal to 360 degrees over 64 µsec, which is approximately 16 kHz.

The 16 kHz frequency error is typically too large for operation. Additional frequency correction may be obtained using the MIMO pilot and the carrier pilot. These pilots span a long enough time duration that the user terminal frequency can be corrected to within the desired target (e.g., 250 Hz). For example, if a TDD frame is 2 msec (as described below) and if the user terminal frequency is accurate to within 250 Hz, then there will be less than half a cycle of phase change over one TDD frame. The phase difference from TDD frame to TDD frame of the beacon pilot may be used to lock the frequency of the user terminal to the clock at the access point, thereby effectively reducing the frequency error to zero.

In general, the set of pilot symbols used for the beacon pilot may be derived using any modulation scheme. Thus, other OFDM symbols derived using BPSK or some other modulation scheme may also be used for the beacon pilot, and this is within the scope of the invention.

In an exemplary design, four transmit antennas are available for beacon pilot transmission. Table 4 lists the OFDM symbols to be transmitted from each of the four transmit antennas for a beacon pilot transmission that spans two symbol periods.

TABLE 3

Beacon Pilot

| Symbol Period | Antenna 1 | Antenna 2 | Antenna 3 | Antenna 4 |
|---|---|---|---|---|
| 1 | B | B | B | B |
| 2 | B | B | B | B |

2. MIMO Pilot

The MIMO pilot includes a specific set of pilot symbols that is transmitted from each of the $N_T$ transmit antennas. For each transmit antenna, the same set of pilot symbols is transmitted for $N_P$ symbol periods designated for MIMO pilot transmission. However, the set of pilot symbols for each transmit antenna is "covered" with a unique orthogonal sequence or code assigned to that antenna. Covering is a process whereby a given pilot or data symbol (or a set of L pilot/data symbols with the same value) to be transmitted is multiplied by all L chips of an L-chip orthogonal sequence to obtain L covered symbols, which are then transmitted. Decovering is a complementary process whereby received symbols are multiplied by the L chips of the same L-chip orthogonal sequence to obtain L decovered symbols, which are then accumulated to obtain an estimate of the transmitted pilot or data symbol. The covering achieves orthogonality among the $N_T$ pilot transmissions from the $N_T$ transmit antennas and allows a receiver to distinguish the individual transmit antennas, as described below. The duration of the MIMO pilot transmission may be dependent on its use, as described below. In general, $N_P$ may be any integer value of one or greater.

One set or different sets of pilot symbols may be used for the $N_T$ transmit antennas. In an exemplary embodiment, one set of pilot symbols is used for all $N_T$ transmit antennas for the MIMO pilot and this set includes 52 QPSK modulation symbols for the 52 usable subbands, which is referred to as a "P" OFDM symbol. The 52 QPSK modulation symbols for the P OFDM symbol are given in Table 2. Signal values of zero are transmitted on the remaining 12 unused subbands.

The 52 QPSK modulation symbols form a unique "word" that is designed to facilitate channel estimation by the user terminals. This unique word is selected to have a minimum peak-to-average variation in a waveform generated based on these 52 modulation symbols.

It is well known that OFDM is generally associated with higher peak-to-average variation in the transmitted waveform than for some other modulation technique (e.g., CDMA). As a result, to avoid clipping of circuitry (e.g., power amplifier) in the transmit chain, OFDM symbols are typically transmitted at a reduced power level, i.e., backed off from the peak transmit power level. The back-off is used to account for variations in the waveform for these OFDM symbols. By minimizing the peak-to-average variation in the waveform for the P OFDM symbol, the MIMO pilot may be transmitted at a higher power level (i.e., a smaller back-off may be applied for the MIMO pilot). The higher transmit power for the MIMO pilot would then result in improved received signal quality for the MIMO pilot at the receiver. The smaller peak-to-average variation may also reduce the amount of distortion and non-linearity generated by the circuitry in the transmit and receive chains. These various factors may result in improved accuracy for a channel estimate obtained based on the MIMO pilot.

An OFDM symbol with minimum peak-to-average variation may be obtained in various manners. For example, a random search may be performed in which a large number of sets of pilot symbols are randomly formed and evaluated to find the set that has the minimum peak-to-average variation. The P OFDM symbol shown in Table 2 represents an exemplary OFDM symbol that may be used for the MIMO pilot. In general, the set of pilot symbols used for the MIMO pilot may be derived using any modulation scheme. Thus, various other OFDM symbols derived using QPSK or some other modulation scheme may also be used for the MIMO pilot, and this is within the scope of the invention.

Various orthogonal codes may be used to cover the P OFDM symbols sent on the $N_T$ transmit antennas. Examples of such orthogonal codes include Walsh codes and orthogonal variable spreading factor (OVSF) codes. Pseudo-orthogonal codes and quasi-orthogonal codes may also be used to cover the P OFDM symbols. An example of a pseudo-orthogonal code is the M-sequence that is well known in the art. An example of a quasi-orthogonal code is the quasi-orthogonal function (QOF) defined by IS-2000. In general, various types of codes may be used for covering, some of which are noted above. For simplicity, the term "orthogonal code" is used herein to generically refer to any type of code suitable for use for covering pilot symbols. The length (L) of the orthogonal code is selected to be greater than or equal to the number of transmit antennas (e.g., $L \geq N_T$), and L orthogonal codes are available for use. Each transmit antenna is assigned a unique orthogonal code. The $N_P$ P OFDM symbols to be sent in $N_P$ symbol periods from each transmit antenna are covered with the orthogonal code assigned to that transmit antenna.

In an exemplary embodiment, four transmit antennas are available and are assigned 4-chip Walsh sequences of $W_1=1111$, $W_2=1010$, $W_3=1100$, and $W_4=1001$ for the MIMO pilot. For a given Walsh sequence, a value of "1" indicates that a P OFDM symbol is transmitted and a value of "0" indicates that a −P OFDM symbol is transmitted. For a −P OFDM symbol, each of the 52 QPSK modulation symbols in the P OFDM symbol is inverted (i.e., multiplied with −1). The result of the covering for each transmit antenna is a sequence of covered P OFDM symbols for that transmit antenna. The covering is in effect performed separately for each of the subbands to generate a sequence of covered pilot symbols for that subband. The sequences of covered pilot symbols for all subbands form the sequence of covered P OFDM symbols.

Table 4 lists the OFDM symbols to be transmitted from each of the four transmit antennas for a MIMO pilot transmission that spans four symbol periods.

TABLE 4

MIMO Pilot

| Symbol Period | Antenna 1 | Antenna 2 | Antenna 3 | Antenna 4 |
|---|---|---|---|---|
| 1 | +P | +P | +P | +P |
| 2 | +P | −P | +P | −P |
| 3 | +P | +P | −P | −P |
| 4 | +P | −P | −P | +P |

For this set of 4-chip Walsh sequences, the MIMO pilot transmission can occur in an integer multiple of four symbol periods to ensure orthogonality among the four pilot transmissions from the four transmit antennas. The Walsh sequence is simply repeated for a MIMO pilot transmission that is longer than the length of the Walsh sequence.

The wireless channel for the MIMO-OFDM system may be characterized by a set of channel response matrices H(k), for subband index $k \in K$, where $K = \pm\{1 \ldots 26\}$ for the exemplary subband structure described above. The matrix H(k) for each subband includes $N_T N_R$ values, $\{h_{i,j}(k)\}$, for $i \in \{1 \ldots N_R\}$ and $j \in \{1 \ldots N_T\}$, where $h_{i,j}(k)$ represents the channel gain between the j-th transmit antenna and the i-th receive antenna.

The MIMO pilot may be used by the receiver to estimate the response of the wireless channel. In particular, to recover the pilot sent from transmit antenna j and received by receive antenna i, the received OFDM symbols on antenna i are first multiplied with the Walsh sequence assigned to transmit antenna j. The "decovered" OFDM symbols for all $N_P$ symbol periods for the MIMO pilot are then accumulated, where the accumulation may be performed individually for each of the 52 usable subbands. The accumulation may also be performed in the time domain on the received OFDM symbols (after removing the cyclic prefix in each OFDM symbol). The accumulation is performed on a sample-by-sample basis over multiple received OFDM symbols, where the samples for each OFDM symbol correspond to different subbands if the accumulation is performed after the FFT and to different time indices if the accumulation is performed prior to the FFT. The result of the accumulation is $\{\hat{h}_{i,j}(k)\}$, for $k \in K$, which are estimates of the channel response from transmit antenna j to receive antenna i for the 52 usable subbands. The same processing may be performed to estimate the channel response from each transmit antenna to each receive antenna. The pilot processing provides $N_T N_R$ complex values for each subband, where the complex values are elements of the matrix $\hat{H}(k)$ for the channel response estimate for that subband.

The pilot processing described above may be performed by the access point to obtain the channel response estimate $\hat{H}_{up}(k)$ for the uplink, and may also be performed by the user terminal to obtain the channel response estimate $\hat{H}_{dn}(k)$ for the downlink.

3. Steered Reference or Steered Pilot

For a MIMO-OFDM system, the channel response matrix H(k) for each subband may be "diagonalized" to obtain the $N_S$ eigenmodes for that subband, where $N_S \leq \min\{N_T, N_R\}$. This may be achieved by performing either singular value decomposition on the channel response matrix H(k) or eigenvalue decomposition on the correlation matrix of H(k), which is $R(k) = H^H(k)H(k)$. For clarity, singular value decomposition is used for the following description.

The singular value decomposition of the channel response matrix H(k) may be expressed as:

$$H(k) = U(k)\Sigma(k)V^H(k), \text{ for } k \in K, \quad \text{Eq (1)}$$

where U(k) is an ($N_R \times N_R$) unitary matrix of left eigenvectors of H(k);
$\Sigma(k)$ is an ($N_R \times N_T$) diagonal matrix of singular values of H(k);
V(k) is an ($N_T \times N_T$) unitary matrix of right eigenvectors of H(k); and
"$H$" denotes the conjugate transpose.

A unitary matrix M is characterized by the property $M^H M = I$, where I is the identity matrix.

Singular value decomposition is described in further detail by Gilbert Strang in a book entitled "Linear Algebra and Its Applications," Second Edition, Academic Press, 1980. An eigenmode normally refers to a theoretical construct. The MIMO channel may also be viewed as including $N_S$ spatial channels that may be used for data/pilot transmission. Each spatial channel may or may not correspond to an eigenmode, depending on whether or not the spatial processing at the transmitter was successful in diagonalizing the MIMO channel. For example, data streams are transmitted on spatial channels (and not eigenmodes) of a MIMO channel if the transmitter has no knowledge or an imperfect estimate of the MIMO channel. For simplicity, the term "eigenmode" is also used herein to denote the case where an attempt is made to diagonalize the MIMO channel, even though it may not be fully successful due to, for example, an imperfect channel estimate.

The diagonal matrix $\Sigma(k)$ for each subband contains non-negative real values along the diagonal and zeros everywhere else. These diagonal entries are referred to as the singular values of H(k) and represent the gains for the independent channels (or eigenmodes) of the MIMO channel for the k-th subband.

The eigenvalue decomposition may be performed independently for the channel response matrix H(k) for each of the 52 usable subbands to determine the $N_S$ eigenmodes for the subband. The singular values for each diagonal matrix $\Sigma(k)$ may be ordered such that $\{\sigma_1(k) \geq \sigma_2(k) \geq \ldots \geq \sigma_{N_S}(k)\}$, where $\sigma_1(k)$ is the largest singular value, $\sigma_2(k)$ is the second largest singular value, and so on, and $\sigma_{N_S}(k)$ is the smallest singular value for the k-th subband. When the singular values for each diagonal matrix $\Sigma(k)$ are ordered, the eigenvectors (or columns) of the associated matrices U(k) and V(k) are also ordered correspondingly. After the ordering, $\sigma_1(k)$ represents the singular value for the best eigenmode for subband k, which is also often referred to as the "principal" eigenmode.

A "wideband" eigenmode may be defined as the set of same-order eigenmodes of all subbands after the ordering. Thus, the m-th wideband eigenmode includes the m-th eigenmode of all subbands. Each wideband eigenmode is associated with a respective set of eigenvectors for all of the subbands. The "principal" wideband eigenmode is the one associated with the largest singular value in each matrix $\hat{\Sigma}(k)$ of each subband after the ordering.

The matrix V(k) includes $N_T$ eigenvectors that may be used for spatial processing at the transmitter, where $V(k) = [v_1(k) \, v_2(k) \ldots v_{N_T}(k)]$ and $v_m(k)$ is the m-th column of V(k), which is the eigenvector for the m-th eigenmode. For a unitary matrix, the eigenvectors are orthogonal to one another. The eigenvectors are also referred to as "steering" vectors.

A steered reference (i.e., a steered pilot) comprises one or more sets of pilot symbols that are transmitted from the $N_T$ transmit antennas. In an embodiment, one set of pilot symbols is transmitted on one set of subbands for one wideband eigenmode in a given symbol period by performing spatial processing with a set of steering vectors for that wideband eigenmode. In another embodiment, multiple sets of pilot symbols are transmitted on multiple disjoint sets of subbands for multiple wideband eigenmodes in a given symbol period by performing spatial processing with multiple sets of steering vectors for these wideband eigenmodes (using subband multiplexing, which is described below). For clarity, the following description assumes that one set of pilot symbols is transmitted on one wideband eigenmode in a given symbol period (i.e., no subband multiplexing).

In an embodiment, the set of pilot symbols for the steered reference is the same P OFDM symbol used for the MIMO pilot. However, various other OFDM symbols may also be used for the steered reference, and this is within the scope of the invention.

A steered reference transmitted for the m-th wideband eigenmode (using beam-forming, which is described below) may be expressed as:

$$\underline{x}_m(k) = \underline{v}_m(k) \cdot p(k), \text{ for } k \in K,\quad \text{Eq (2)}$$

where $\underline{x}_m(k)$ is an $(N_T \times 1)$ transmit vector for the m-th eigenmode of the k-th subband;

$\underline{v}_m(k)$ is the steering vector for the m-th eigenmode of the k-th subband; and $p(k)$ is the pilot symbol for the k-th subband (e.g., as given in Table 2).

The vector $\underline{x}_m(k)$ includes $N_T$ transmit symbols to be sent from the $N_T$ transmit antennas for the k-th subband.

The steered reference may be used by the receiver to estimate a vector that may be used for spatial processing of both data reception and transmission, as described below. The processing for the steered reference is described in further detail below.

4. Carrier Pilot

The exemplary OFDM subband structure described above includes four pilot subbands with indices of −21, −7, 7, and 21. In an embodiment, a carrier pilot is transmitted on the four pilot subbands in all symbol periods that are not used for some other types of pilot. The carrier pilot may be used by the receiver to track the changes in the phase of an RF carrier signal and drifts in the oscillators at both the transmitter and receiver. This may provide improved data demodulation performance.

In an embodiment, the carrier pilot comprises four pilot sequences, $P_{c1}(n)$, $P_{c2}(n)$, $P_{c3}(n)$ and $P_{c4}(n)$ that are transmitted on the four pilot subbands. In an embodiment, the four pilot sequences are defined as follows:

$$P_{c1}(n) = P_{c2}(n) = P_{c3}(n) = -P_{c4}(n),\quad \text{Eq (3)}$$

where n is an index for symbol period (or OFDM symbol).

The pilot sequences may be defined based on various data sequences. In an embodiment, the pilot sequence $P_{c1}(n)$ is generated based on a polynomial $G(x) = x^7 + x^4 + x$, where the initial state is set to all ones and the output bits are mapped to signal values as follows: $1 \Rightarrow -1$ and $0 \Rightarrow 1$. The pilot sequence $P_{c1}(n)$, for $n = \{1, 2, \ldots 127\}$, may then be expressed as:

$$P_{c1}(n) = \{1, 1, 1, 1, -1, -1, -1, 1, -1, -1, -1, -1, 1, 1, -1,$$
$$1, -1, -1, 1, 1, -1, 1, 1, -1, 1, 1, 1, 1, 1, 1, -1, 1,$$
$$1, 1, -1, 1, 1, -1, -1, 1, 1, -1, 1, -1, -1, -1, 1,$$
$$-1, 1, -1, -1, 1, -1, -1, 1, 1, 1, 1, 1, -1, -1, 1, 1,$$
$$-1, -1, 1, -1, 1, -1, 1, 1, -1, -1, -1, 1, 1, -1, -1,$$
$$-1, -1, 1, -1, -1, 1, -1, 1, 1, 1, 1, -1, 1, -1, 1,$$
$$-1, 1,$$
$$-1, -1, -1, -1, -1, 1, -1, 1, 1, -1, 1, -1, 1, 1, 1,$$
$$-1, -1, 1, -1, -1, -1, 1, 1, 1, -1, -1, -1, -1, -1,$$
$$-1, 1\}.$$

The values of "1" and "−1" in the pilot sequence $P_{c1}(n)$ may be mapped to pilot symbols using a particular modulation scheme. For example, using BPSK, a "1" may be mapped to $1+j$ and a "−1" may be mapped to $-(1+j)$. If there are more than 127 OFDM symbols, then the pilot sequence may be repeated so that $P_{c1}(n) = P_{c1}(n \bmod 127)$ for $n > 127$.

In one embodiment, the four pilot sequences $P_{c1}(n)$, $P_{c2}(n)$, $P_{c3}(n)$, and $P_{c4}(n)$ are transmitted on four different subband/antenna pairings. Table 5 shows an exemplary assignment of the four pilot sequences to the four pilot subbands and four transmit antennas.

TABLE 5

| | Carrier Pilot | | | |
|---|---|---|---|---|
| Subband | Antenna 1 | Antenna 2 | Antenna 3 | Antenna 4 |
| −21 | $P_{c1}(n)$ | — | — | — |
| −7 | — | $P_{c2}(n)$ | — | — |
| 7 | — | — | $P_{c3}(n)$ | — |
| 21 | — | — | — | $P_{c4}(n)$ |

As shown in Table 5, the pilot sequence $P_{c1}(n)$ is transmitted on subband −21 of antenna 1, the pilot sequence $P_{c2}(n)$ is transmitted on subband −7 of antenna 2, the pilot sequence $P_{c3}(n)$ is transmitted on subband 7 of antenna 3, and the pilot sequence $P_{c4}(n)$ is transmitted on subband 21 of antenna 4. Each pilot sequence is thus transmitted on a unique subband and a unique antenna. This carrier pilot transmission scheme avoids interference that would result if a pilot sequence is transmitted over multiple transmit antennas on a given subband.

In another embodiment, the four pilot sequences are transmitted on the principal eigenmode of their assigned subbands. The spatial processing for the carrier pilot symbols is similar to the spatial processing for the steered reference, which is described above and shown in equation (2). To transmit the carrier pilot on the principal eigenmode, the steering vector $\underline{v}_1(k)$ is used for the spatial processing. Thus, the pilot sequence $P_{c1}(n)$ is spatially processed with the steering vector $\underline{v}_1(-26)$, the pilot sequence $P_{c2}(n)$ is spatially processed with the steering vector $\underline{v}_1(-7)$, the pilot sequence $P_{c3}(n)$ is spatially processed with the steering vector $\underline{v}_1(7)$, and the pilot sequence $P_{c4}(n)$ is spatially processed with the steering vector $\underline{v}_1(26)$.

II. Pilots for Single-Carrier MIMO Systems

The pilots described herein may also be used for single-carrier MIMO systems that do not employ OFDM. In that case, much of the description above still applies but without the subband index k. For the beacon pilot, a specific pilot modulation symbol b may be transmitted from each of the $N_T$ transmit antennas. For the MIMO pilot, a specific pilot modulation symbol p may be covered with $N_T$ orthogonal sequences and transmitted from the $N_T$ transmit antennas. The pilot symbol b may be the same or different from the pilot symbol p. The steered reference may be transmitted as shown in equation (2). However, the transmit vector $\underline{x}_m$, steering vector $\underline{v}_m$, and pilot symbol p are not functions of subband index k. The carrier pilot may be transmitted in a time division multiplexed manner or may simply be omitted.

For a MIMO-OFDM system, the cyclic prefix is typically used to ensure orthogonality across the subbands in the presence of delay spread in the system, and the orthogonal codes allow for identification of the individual transmit antennas. For a single-carrier MIMO system, the orthogonal codes are relied upon for both orthogonality and antenna identification. Thus, the orthogonal codes used for covering the pilot symbols in a single-carrier MIMO system may be selected to have good cross-correlation and peak-to-sidelobe properties (i.e., the correlation between any two orthogonal sequences used for covering is small in the presence of delay spread in the system). An example of such an orthogonal code with good cross-correlation and peak-to-sidelobe properties is the M-sequence and its time-shifted versions. However, other types of codes may also be used for covering pilot symbols for the single-carrier MIMO system.

For a wideband single-carrier MIMO system, the steered reference may be transmitted in various manners to account for frequency selective fading (i.e., a frequency response that is not flat across the operating band). Several schemes for transmitting a steered reference in a wideband single-carrier MIMO system are described below. In general, a transmitter can transmit a reference waveform that is processed in the same or similar manner as the processing used to transmit traffic data on specific wideband eigenmodes. The receiver can then in some manner correlate the received waveform against a locally generated copy of the transmitted reference waveform, and extract information about the channel that allows the receiver to estimate a channel matched filter.

In a first scheme, a transmitter initially obtains a steering vector $\underline{v}_m(k)$ for an eigenmode. The steering vector $\underline{v}_m(k)$ may be obtained by periodically transmitting OFDM pilot symbols, by performing frequency-domain analysis on a received MIMO pilot that has been transmitted without OFDM, or by some other means. For each value of k, where $1 \leq k \leq N_F$, $\underline{v}_m(k)$ is an $N_T$-vector with $N_T$ entries for $N_T$ transmit antennas. The transmitter then performs an inverse fast Fourier transform on each of the $N_T$ vector positions of the steering vector $\underline{v}_m(k)$, with k as the frequency variable in the IFFT computation, to obtain a corresponding time-domain pulse for an associated transmit antenna. Each vector position of the vector $\underline{v}_m(k)$ includes $N_s$ values for $N_F$ frequency subbands, and the corresponding time-domain pulse is a sequence of $N_F$ time-domain values. The terminal then appends a cyclic prefix to this time-domain pulse to obtain a steered reference pulse for the transmit antenna. One set of $N_T$ steered reference pulses is generated for each eigenmode and may be transmitted in the same time interval from all $N_T$ transmit antennas. Multiple sets of pulses may be generated for multiple eigenmodes and may be transmitted in a TDM manner.

For the first scheme, a receiver samples the received signal to obtain a received vector $\underline{r}_m(n)$, removes the cyclic prefix, and performs a fast Fourier transform on each vector position of the received vector $\underline{r}_m(n)$ to obtain an estimate of a corresponding entry of $\underline{H}(k)\underline{v}_m(k)$. Each vector position of the received vector $\underline{r}_m(n)$ (after the cyclic prefix removal) includes $N_F$ time-domain samples. The receiver then uses the estimate of $\underline{H}(k)\underline{v}_m(k)$ to synthesize a time-domain matched filter that may be used to filter a received data transmission. The time-domain matched filter includes a matched filter pulse for each of the received antennas. The synthesis of the time-domain matched filter is described in commonly assigned U.S. patent application Ser. No. 10/017,308, entitled "Time-Domain Transmit and Receive Processing with Channel Eigen-mode Decomposition for MIMO Systems," filed Dec. 7, 2001.

For the first scheme, the transmitter processing for the steered reference in a single-carrier MIMO system is similar to the transmitter processing for the steered reference in a MIMO-OFDM system. However, other transmission after the steered reference is transmitted on a single-carrier waveform, such as the one described in the aforementioned U.S. patent application Ser. No. 10/017,308. Moreover, the receiver uses the steered reference to synthesize time domain matched filters, as described above.

In a second scheme, a transmitter isolates a single multipath component for the wideband channel. This may be achieved, for example, by searching a received MIMO pilot with a sliding correlator in similar manner as often performed in CDMA systems to search for multipath components. The transmitter then treats this multipath component as a narrowband channel and obtains a single steering vector $\underline{v}_m$ for the multipath component for each eigenmode. Again, multiple steering vectors may be generated for multiple eigenmodes for this multipath component.

III. Pilot Structure for a TDD MIMO-OFDM System

The pilots described herein may be used for various MIMO and MIMO-OFDM systems. These pilots may be used for systems that use a common or separate frequency bands for the downlink and uplink. For clarity, an exemplary pilot structure for an exemplary MIMO-OFDM system is described below. For this MIMO-OFDM system, the downlink and uplink are time-division duplexed (TDD) on a single frequency band.

Figure 2:
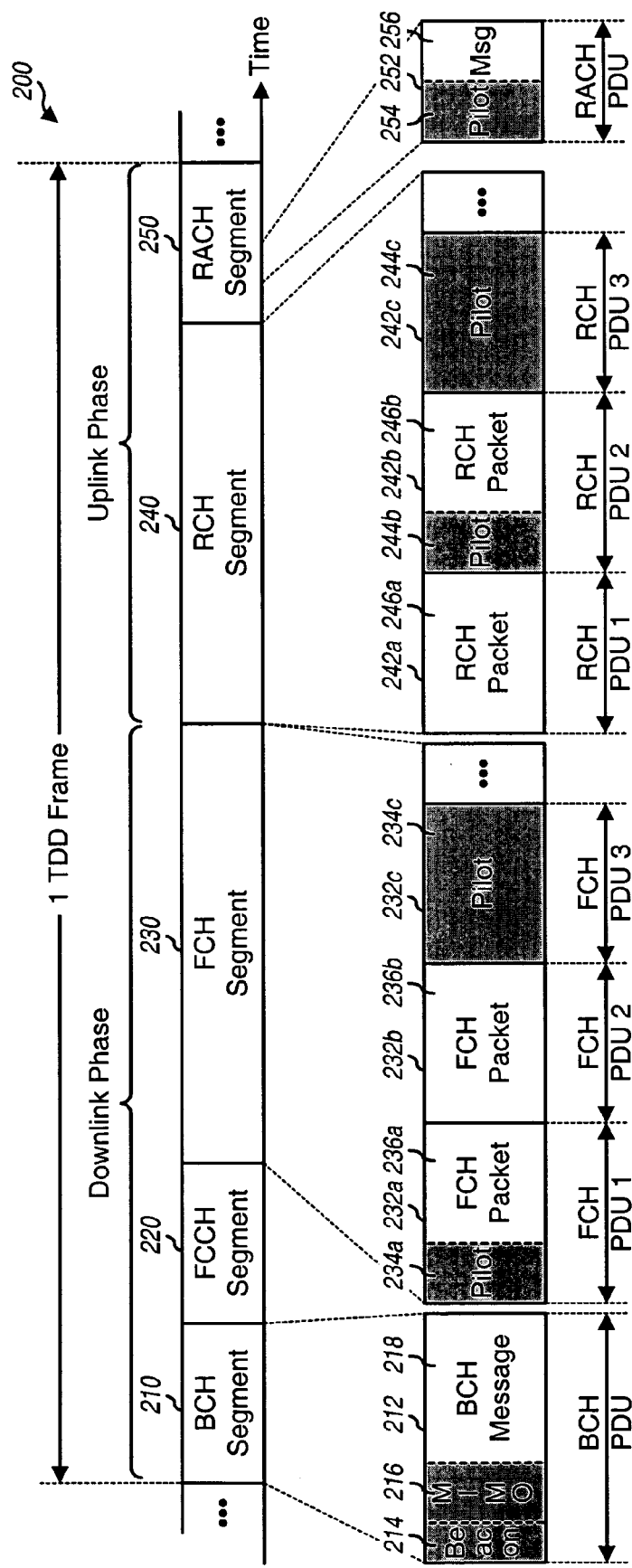
FIG. 2 shows an exemplary frame structure for data transmission in a TDD MIMO-OFDM system.

FIG. 2 shows an embodiment of a frame structure 200 that may be used for a TDD MIMO-OFDM system. Data transmission occurs in units of TDD frames, each of which spans a particular time duration (e.g., 2 msec). Each TDD frame is partitioned into a downlink phase and an uplink phase. The downlink phase is further partitioned into multiple segments for multiple downlink transport channels. In the embodiment shown in FIG. 2, the downlink transport channels include a broadcast channel (BCH), a forward control channel (FCCH), and a forward channel (FCH). Similarly, the uplink phase is partitioned into multiple segments for multiple uplink transport channels. In the embodiment shown in FIG. 2, the uplink transport channels include a reverse channel (RCH) and a random access channel (RACH).

On the downlink, a BCH segment 210 is used to transmit one BCH protocol data unit (PDU) 212, which includes a portion 214 for a beacon pilot, a portion 216 for a MIMO pilot, and a portion 218 for a BCH message. The BCH message carries system parameters for the user terminals in the system. An FCCH segment 220 is used to transmit one FCCH PDU, which carries assignments for downlink and uplink resources and other signaling for the user terminals. An FCH segment 230 is used to transmit one or more FCH PDUs 232. Different types of FCH PDU may be defined. For example, an FCH PDU 232a includes a portion 234a for a pilot and a portion 236a for a data packet. An FCH PDU 232b includes a single portion 236b for a data packet. An FCH PDU 232c includes a single portion 234c for a pilot.

On the uplink, an RCH segment 240 is used to transmit one or more RCH PDUs 242 on the uplink. Different types of RCH PDU may also be defined. For example, an RCH PDU 242a includes a single portion 246a for a data packet. An RCH PDU 242b includes a portion 244b for a pilot and a portion 246b for a data packet. An RCH PDU 242c includes a single portion 244c for a pilot. An RACH segment 250 is used by the user terminals to gain access to the system and to send short messages on the uplink. An RACH PDU 252 may be sent within RACH segment 250 and includes a portion 254 for a pilot and a portion 256 for a message.

For the embodiment shown in FIG. 2, the beacon and MIMO pilots are sent on the downlink in each TDD frame in the BCH segment. A pilot may or may not be sent in any given FCH/RCH PDU. If the pilot is sent, then it may span all or only a portion of the PDU, as shown in FIG. 2. A pilot is sent in an RACH PDU to allow the access point to estimate pertinent vectors during access. The pilot portion is also referred to as a "preamble". The pilot that is sent in any given FCH/RCH PDU may be a steered reference or a MIMO pilot, depending on the purpose for which the pilot is used. The pilot sent in an RACH PDU is typically a steered reference, although a MIMO pilot may also be sent instead. The carrier pilot is transmitted on the pilot subbands and in the portions that are not used for other pilot transmissions. The carrier pilot is not shown in FIG. 2 for simplicity. The durations of the various portions in FIG. 2 are not drawn to scale.

The frame structure and transport channels shown in FIG. 2 are described in detail in the aforementioned provisional U.S. Patent Application Ser. No. 60/421,309.

1. Calibration

For a TDD MIMO-OFDM system with a shared frequency band, the downlink and uplink channel responses may be assumed to be reciprocal of one another. That is, if H(k) represents a channel response matrix from antenna array A to antenna array B for subband k, then a reciprocal channel implies that the coupling from array B to array A is given by $H^T(k)$, where $H^T$ denotes the transpose of H. For the TDD MIMO-OFDM system, the reciprocal channel characteristics can be exploited to simplify the channel estimation and spatial processing at both the transmitter and receiver.

However, the frequency responses of the transmit and receive chains at the access point are typically different from the frequency responses of the transmit and receive chains at the user terminal. An "effective" downlink channel response, $H_{dn}(k)$, and an "effective" uplink channel response, $H_{up}(k)$, which include the responses of the applicable transmit and receive chains, may be expressed as:

$$H_{dn}(k) = R_{ut}(k) H(k) T_{ap}(k), \text{ for } k \in K, \text{ and}$$

$$H_{up}(k) = R_{ap}(k) H^T(k) T_{ut}(k), \text{ for } k \in K, \quad \text{Eq (4)}$$

where $T_{ap}(k)$ and $R_{ap}(k)$ are $N_{ap} \times N_{ap}$ diagonal matrices for the frequency responses of the transmit chain and receive chain, respectively, at the access point for subband k;

$T_{ut}(k)$ and $R_{ut}(k)$ are $N_{ut} \times N_{ut}$ diagonal matrices for the frequency responses of the transmit chain and receive chain, respectively, at the user terminal for subband k, $N_{ap}$ is the number of antennas at the access point; and $N_{ut}$ is the number of antennas at the user terminal.

Combining the equations in equation set (4), the following is obtained:

$$H_{up}(k) \underline{K}_{ut}(k) = (H_{dn}(k) \underline{K}_{ap}(k))^T, \text{ for } k \in K, \quad \text{Eq (5)}$$

where $\underline{K}_{ut}(k) = T_{ut}^{-1}(k) R_{ut}(k)$ and $\underline{K}_{ap}(k) = T_{ap}^{-1}(k) R_{ap}(k)$. Because $T_{ut}(k)$, $R_{ut}(k)$, $T_{ap}(k)$, and $R_{ap}(k)$ are diagonal matrices, $\underline{K}_{ap}(k)$ and $\underline{K}_{ut}(k)$ are also diagonal matrices.

Calibration may be performed to obtain estimates, $\hat{K}_{ap}(k)$ and $\hat{K}_{ut}(k)$, of the actual diagonal matrices, $\underline{K}_{ap}(k)$ and $\underline{K}_{ut}(k)$, for $k \in K$. The matrices $\hat{K}_{ap}(k)$ and $\hat{K}_{ut}(k)$ contain correction factors that can account for differences in the frequency responses of the transmit/receive chains at the access point and user terminal. A "calibrated" downlink channel response, $H_{cdn}(k)$, observed by the user terminal and a "calibrated" uplink channel response, $H_{cup}(k)$, observed by the access point may then be expressed as:

$$H_{cdn}(k) = H_{dn}(k) \hat{\underline{K}}_{ap}(k), \text{ for } k \in K, \text{ and} \quad \text{Eq (6a)}$$

$$H_{cup}(k) = H_{up}(k) \hat{\underline{K}}_{ut}(k), \text{ for } k \in K, \text{ where} \quad \text{Eq (6b)}$$

$$H_{cdn}(k) \approx H_{cup}^T(k), \text{ for } k \in K. \quad \text{Eq (6c)}$$

The accuracy of the relationship in equation (6c) is dependent on the accuracy of the correction matrices, $\hat{K}_{ap}(k)$ and $\hat{K}_{ut}(k)$, which is in turn dependent on the quality of the estimates of the effective downlink and uplink channel responses, $\hat{H}_{dn}(k)$ and $\hat{H}_{up}(k)$, used to derive these correction matrices. A correction vector $\hat{\underline{k}}_{ut}(k)$ may be defined to include only the $N_{ut}$ diagonal elements of $\hat{K}_{ut}(k)$, and a correction vector $\hat{\underline{k}}_{ap}(k)$ may be defined to include only the $N_{ap}$ diagonal elements of $\hat{K}_{ap}(k)$. Calibration is described in detail in the aforementioned provisional U.S. Patent Application Serial No. 60/421,462.

The pilots described herein may also be used for MIMO and MIMO-OFDM systems that do not perform calibration. For clarity, the following description assumes that calibration is performed and that the correction matrices $\hat{K}_{ap}(k)$ and $\hat{K}_{ut}(k)$ are used in the transmit paths at the access point and the user terminal, respectively.

2. Beacon and MIMO Pilots

As shown in FIG. 2, the beacon pilot and MIMO pilot are transmitted on the downlink in the BCH for each TDD frame. The beacon pilot may be used by the user terminals for timing and frequency acquisition. The MIMO pilot may be used by the user terminals to (1) obtain an estimate of the downlink MIMO channel, (2) derive steering vectors for uplink transmission, and (3) derive a matched filter for downlink transmission, as described below.

In an exemplary pilot transmission scheme, the beacon pilot is transmitted for two symbol periods and the MIMO pilot is transmitted for eight symbol periods at the start of the BCH segment. Table 6 shows the beacon and MIMO pilots for this exemplary scheme.

TABLE 6

Beacon and MIMO Pilots for BCH

| Pilot Type | Symbol Period | Antenna 1 | Antenna 2 | Antenna 3 | Antenna 4 |
|---|---|---|---|---|---|
| Beacon Pilot | 1 | B | B | B | B |
|  | 2 | B | B | B | B |
| MIMO Pilot | 3 | +P | +P | +P | +P |
|  | 4 | +P | −P | +P | −P |
|  | 5 | +P | +P | −P | −P |
|  | 6 | +P | −P | −P | +P |
|  | 7 | +P | +P | +P | +P |
|  | 8 | +P | −P | +P | −P |
|  | 9 | +P | +P | −P | −P |
|  | 10 | +P | −P | −P | +P |

The beacon pilot transmitted on the downlink may be expressed as:

$$\underline{x}_{dn,bp}(k) = \hat{\underline{k}}_{ap}(k) b(k) \text{ for } k \in K, \quad \text{Eq (7)}$$

where $\underline{x}_{dn,bp}(k)$ is a transmit vector for subband k for the beacon pilot; and b(k) is the pilot symbol to be transmitted on subband k for the beacon pilot, which is given in Table 2.

As shown in equation (7), the beacon pilot is scaled by the correction vector $\hat{\underline{k}}_{ap}(k)$ but not subjected to any other spatial processing.

The MIMO pilot transmitted on the downlink may be expressed as:

$$\underline{x}_{dn,mp,n}(k) = \hat{\underline{K}}_{ap}(k) \underline{w}_{dn,n} p(k), \text{ for } k \in K, \quad \text{Eq (8)}$$

where $\underline{x}_{dn,mp,n}(k)$ is an ($N_{ap} \times 1$) transmit vector for subband k in symbol period n for the downlink MIMO pilot;

$\underline{w}_{dn,n}$ is an ($N_{ap} \times 1$) vector with $N_{ap}$ Walsh chips for the $N_{ap}$ transmit antennas at the access point in symbol period n for the downlink MIMO pilot; and p(k) is the pilot symbol to be transmitted on subband k for the MIMO pilot, which is given in Table 2.

As shown in equation (8), the MIMO pilot is covered by the vector $\underline{w}_{dn,n}$ and further scaled by the correction matrix $\hat{K}_{ap}(k)$, but not subjected to any other spatial processing. The same Walsh vector $\underline{w}_{dn,n}$ is used for all subbands, and thus $\underline{w}_{dn,n}$ is not a function of the subband index k. However, since each Walsh sequence is a unique sequence of 4 Walsh chips for 4 symbol periods, $w_{dn,n}$ is a function of symbol period n. The vector $\underline{w}_{dn,n}$ thus includes $N_{ap}$ Walsh chips to be used for the $N_{ap}$ transmit antennas at the access point for symbol period n. For the scheme shown in Table 6, the four vectors $\underline{w}_{dn,n}$, for n={3, 4, 5, 6}, for the first four symbol periods of MIMO pilot transmission on the BCH are $\underline{w}_3$=[1 1 1 1], $\underline{w}_4$=[1 −1 1 −1], $\underline{w}_5$=[1 1 −1 −1], $\underline{w}_6$[1 −1 −1 1], and the four vectors $\underline{w}_{dn,n}$ for n={7, 8, 9, 10}, for the next four symbol periods are repeated such that $\underline{w}_7=\underline{w}_3$, $\underline{w}_8=\underline{w}_4$, $\underline{w}_9=\underline{w}_5$, and $\underline{w}_{10}=e,unsw_6$.

The MIMO pilot transmitted on the uplink may be expressed as:

$$\underline{x}_{up,mp,n}(k) = \hat{\underline{K}}_{ut}(k)\underline{w}_{up,n}p(k), \text{ for } k \in K, \quad \text{Eq (9)}$$

where $x_{up,mp,n}(k)$ is an ($N_{ut} \times 1$) transmit vector for subband k in symbol period n for the uplink MIMO pilot. The Walsh vector $\underline{w}_{up,n}$ used for the uplink MIMO pilot may be the same or different from the Walsh vector $\underline{w}_{dn,n}$ used for the downlink MIMO pilot. For example, if a user terminal is equipped with only two transmit antennas, then $\underline{w}_{up,n}$ may include two Walsh sequences with length of 2 or greater.

3. Spatial Processing

As described above, the channel response matrix for each subband may be diagonalized to obtain the $N_S$ eigenmodes for that subband. The singular value decomposition of the calibrated uplink channel response matrix, $H_{cup}(k)$, may be expressed as:

$$H_{cup}(k) = U_{ap}(k)\Sigma(k)V_{ut}^H(k) \text{ for } k \in K, \quad \text{Eq (10)}$$

where $U_{ap}(k)$ is an ($N_{ut} \times N_{ut}$) unitary matrix of left eigenvectors of $H_{cup}(k)$;

$\Sigma(k)$ is an ($N_{ut} \times N_{ap}$) diagonal matrix of singular values of $H_{cup}(k)$; and $V_{ut}(k)$ is an ($N_{ap} \times N_{ap}$) unitary matrix of right eigenvectors of $H_{cup}(k)$.

Similarly, the singular value decomposition of the calibrated downlink channel response matrix, $H_{cdn}(k)$, may be expressed as:

$$H_{cdn}(k) = V_{ut}^*(k)\Sigma(k)U_{ap}^T(k), \text{ for } k \in K, \quad \text{Eq (11)}$$

where the matrices $V_{ut}^*(k)$ and $U_{ap}^*(k)$ are unitary matrices of left and right eigenvectors, respectively, of $H_{cdn}(k)$.

As shown in equations (10) and (11) and based on the above description, the matrices of left and right eigenvectors for one link are the complex conjugate of the matrices of right and left eigenvectors, respectively, for the other link. For simplicity, reference to the matrices $U_{ap}(k)$ and $V_{ut}(k)$ in the following description may also refer to their various other forms (e.g., $V_{ut}(k)$ may refer to $V_{ut}(k)$, $V_{ut}^*(k)$, $V_{ut}^T(k)$, and $V_{ut}^H(k)$). The matrices $U_{ap}(k)$ and $V_{ut}(k)$ may be used by the access point and user terminal, respectively, for spatial processing and are denoted as such by their subscripts.

In an embodiment, the user terminal can estimate the calibrated downlink channel response based on a MIMO pilot transmitted by the access point. The user terminal may then perform singular value decomposition of the calibrated downlink channel response estimate $\hat{H}_{cdn}(k)$, for $k \in K$, to obtain the diagonal matrix $\hat{\Sigma}(k)$ and the matrix $\hat{V}_{ut}^*(k)$ of left eigenvectors of $\hat{H}_{cdn}(k)$ for each subband. This singular value decomposition may be given as $\hat{H}_{cdn}(k) = \hat{V}_{ut}^*(k)\hat{\Sigma}(k)\hat{U}_{ap}^T(k)$, where the hat ("^") above each matrix indicates that it is an estimate of the actual matrix. Similarly, the access point can estimate the calibrated uplink channel response based on a MIMO pilot transmitted by the user terminal. The access point may then perform singular value decomposition of the calibrated uplink channel response estimate $\hat{H}_{cup}(k)$, for $k \in K$, to obtain the diagonal matrix $\hat{\Sigma}(k)$ and the matrix $\hat{U}_{ap}(k)$ of left eigenvectors of $\hat{H}_{cup}(k)$ for each subband. This singular value decomposition may be given as $\hat{H}_{cup}(k) = \hat{U}_{ap}(k)\hat{\Sigma}(k)\hat{V}_{ut}^H(k)$. The access point and user terminal may also obtain the required eigenvectors based on a steered reference, as described below.

Data transmission can occur on one or multiple wideband eigenmodes for each link. The specific number of wideband eigenmodes to use for data transmission is typically dependent on the channel conditions and may be selected in various manners. For example, the wideband eigenmodes may be selected by using a water-filling procedure that attempts to maximize the overall throughput by (1) selecting the best set of one or more wideband eigenmodes to use, and (2) distributing the total transmit power among the selected wideband eigenmode(s).

The MIMO-OFDM system may thus be designed to support multiple operating modes, including:

Spatial multiplexing mode—used to transmit data on multiple wideband eigenmodes, and Beam-steering mode—used to transmit data on the principal (best) wideband eigenmode.

Data transmission on multiple wideband eigenmodes may be achieved by performing spatial processing with multiple sets of eigenvectors in the matrices $U_{ap}(k)$ or $V_{ut}(k)$, for $k \in K$ (i.e., one set of eigenvectors for each wideband eigenmode). Table 7 summarizes the spatial processing at the access point and user terminal for both data transmission and reception for the spatial multiplexing mode.

TABLE 7

| | Spatial Processing for Spatial Multiplexing Mode | |
|---|---|---|
| | Downlink | Uplink |
| Access Point | Transmit: $x_{dn}(k) = \hat{K}_{ap}(k)\hat{U}_{ap}^*(k)s_{dn}(k)$ | Receive: $\hat{s}_{up}(k) = \sum^{\hat{\Sigma}^{-1}}(k)\hat{U}_{ap}^H(k)r_{up}(k)$ |
| User Terminal | Receive: $\hat{s}_{dn}(k) = \sum^{\hat{\Sigma}^{-1}}(k)\hat{V}_{ut}^T(k)r_{dn}(k)$ | Transmit: $x_{up}(k) = \hat{K}_{ut}(k)\hat{V}_{ut}(k)s_{up}(k)$ |

In Table 7, s(k) is a "data" vector with up to $N_S$ non-zero entries for the modulation symbols to be transmitted on the $N_S$ eigenmodes of subband k, x(k) is a transmit vector for subband k, r(k) is a received vector for subband k, and ŝ(k) is an estimate of the transmitted data vector s(k). The subscripts "dn" and "up" for these vectors denote downlink and uplink transmissions, respectively.

Data transmission on one wideband eigenmode may be achieved by using either "beam-forming" or "beam-steering". For beam-forming, the modulation symbols are spatially processed with a set of eigenvectors $\hat{v}_{ut,1}(k)$ or $\hat{u}_{ap,1}(k)$, for $k \in K$, for the principal wideband eigenmode. For beam-steering, the modulation symbols are spatially processed with a set of "normalized" (or "saturated") eigenvectors $\tilde{v}_{ut}(k)$ or $\tilde{u}_{ap}(k)$, for k∈K, for the principal wideband eigenmode. The normalized eigenvectors $\tilde{v}_{ut}(k)$ and $\tilde{u}_{ap}(k)$ can be derived as described below.

The spatial processing for the spatial multiplexing and beam-steering modes is described in detail in the aforementioned provisional U.S. Patent Application Ser. Nos. 60/421,309 and 60/421,428. The steered references for the spatial multiplexing and beam-steering modes are described below.

4. Steered Reference

For a reciprocal channel (e.g., after calibration has been performed to account for differences in the transmit/receive chains at the access point and user terminal), a steered reference may be transmitted by the user terminal and used by the access point to obtain estimates of both $\hat{U}_{ap}(k)$ and $\hat{\Sigma}(k)$, for k∈K, without having to estimate the MIMO channel or perform the singular value decomposition. Similarly, a steered reference may be transmitted by the access point and used by the user terminal to obtain estimates of both $\hat{V}_{ut}(k)$ and $\hat{\Sigma}(k)$, for k∈K.

In an embodiment, the steered reference comprises a set of pilot symbols (e.g., the P OFDM symbol) that is transmitted on one wideband eigenmode in a given symbol period by performing spatial processing with a set of unnormalized or normalized eigenvectors for that wideband eigenmode. In an alternative embodiment, the steered reference comprises multiple sets of pilot symbols that are transmitted on multiple wideband eigenmodes in the same symbol period by performing spatial processing with multiple sets of unnormalized or normalized eigenvectors for these wideband eigenmodes. In any case, the steered reference is transmitted from all $N_{ap}$ antennas at the access point (for the downlink) and all $N_{ut}$ antennas at the user terminal (for the uplink). For clarity, the following description assumes that the steered reference is transmitted for one wideband eigenmode in a given symbol period.

A. Downlink Steered Reference—Spatial Multiplexing Mode

For the spatial multiplexing mode, the downlink steered reference transmitted on the m-th wideband eigenmode by the access point may be expressed as:

$$\underline{x}_{dn,sr,m}(k) = \hat{\underline{K}}_{ap}(k)\hat{\underline{u}}_{ap,m}^*(k)p(k), \text{ for } k \in K, \quad \text{Eq (12)}$$

where $\underline{x}_{dn,sr,m}(k)$ is the transmit vector for the k-th subband of the m-th wideband eigenmode;

$\hat{\underline{u}}_{ap,m}^*(k)$ is the eigenvector for the k-th subband of the m-th wideband eigenmode; and p(k) is the pilot symbol to be transmitted on subband k for the steered reference (e.g., as given in Table 2).

The steering vector $\hat{\underline{u}}_{ap,m}^*(k)$ is the m-th column of the matrix $\hat{U}_{ap}^*(k)$, where $\hat{U}_{ap}^*(k) = [\hat{\underline{u}}_{ap,1}^*(k)\ \hat{\underline{u}}_{ap,2}^*(k) \ldots \hat{\underline{u}}_{ap,N_{ap}}^*(k)]$.

The received downlink steered reference at the user terminal for the spatial multiplexing mode may be expressed as:

$$\underline{r}_{dn,sr,m}(k) = \underline{H}_{dn}(k)\underline{x}_{dn,sr,m}(k) + \underline{n}_{dn}(k), \text{ for } k \in K, \quad \text{Eq (13)}$$

$$\approx \hat{\underline{v}}_{ut,m}^*(k)\sigma_m(k)p(k) + \underline{n}_{dn}(k)$$

where $\sigma_m(k)$ is the singular value for the k-th subband of the m-th wideband eigenmode.

B. Downlink Steered Reference—Beam-Steering Mode

For the beam-steering mode, the spatial processing at the transmitter is performed using a set of "normalized" eigenvectors for the principal wideband eigenmode. The overall transfer function with a normalized eigenvector $\tilde{\underline{u}}_{ap}(k)$ is different from the overall transfer function with an unnormalized eigenvector $\hat{\underline{u}}_{ap,1}(k)$ (i.e., $\underline{H}_{dn}(k)\hat{\underline{K}}_{ap}(k)\hat{\underline{u}}_{ap,1}^*(k) \neq \underline{H}_{dn}(k)\hat{\underline{K}}_{ap}(k)\tilde{\underline{u}}_{ap}(k)$). A steered reference generated using the set of normalized eigenvectors for the principal wideband eigenmode may then be sent by the transmitter and used by the receiver to derive the matched filter for the beam-steering mode.

For the beam-steering mode, the downlink steered reference transmitted on the principal wideband eigenmode by the access point may be expressed as:

$$\underline{\tilde{x}}_{dn,sr}(k) = \hat{\underline{K}}_{ap}(k)\tilde{\underline{u}}_{ap}(k)p(k), \text{ for } k \in K, \quad \text{Eq (14)}$$

where $\tilde{\underline{u}}_{ap}(k)$ is the normalized eigenvector for the k-th subband of the principal wideband eigenmode, which may be expressed as:

$$\tilde{\underline{u}}_{ap}(k) = [Ae^{j\theta_{u1}(k)}\ Ae^{j\theta_{u2}(k)} \ldots Ae^{j\theta_{uN_{ap}}(k)}]^T, \quad \text{Eq (15)}$$

where A is a constant (e.g., A=1); and $\theta_{ui}(k)$ is the phase for the k-th subband of the i-th transmit antenna, which is given as:

$$\theta_{ui}(k) = \angle \hat{u}_{ap,1,i}^*(k) = \tan^{-1}\left(\frac{\text{Im}\{\hat{u}_{ap,1,i}^*(k)\}}{\text{Re}\{\hat{u}_{ap,1,i}^*(k)\}}\right). \quad \text{Eq (16)}$$

As shown in equation (15), the $N_{ap}$ elements of the vector $\tilde{\underline{u}}_{ap}(k)$ have equal magnitudes but possibly different phases. As shown in equation (16), the phase of each element in the vector $\tilde{\underline{u}}_{ap}(k)$ is obtained from the corresponding element of the vector $\hat{\underline{u}}_{ap,1}^*(k)$ (i.e., $\theta_{ui}(k)$ is obtained from $\hat{u}_{ap,1,i}(k)$, where $\hat{\underline{u}}_{ap,1}^*(k) = [\hat{u}_{ap,1,1}^*(k)\ \hat{u}_{ap,1,2}^*(k) \ldots \hat{u}_{ap,1,N_{ap}}^*(k)]^T$).

The received downlink steered reference at the user terminal for the beam-steering mode may be expressed as:

$$\tilde{\underline{r}}_{dn,sr}(k) = \underline{H}_{dn}(k)\tilde{\underline{x}}_{dn,sr}(k) + \underline{n}_{dn}(k), \text{ for } k \in K. \quad \text{Eq (17)}$$

$$\approx \underline{H}_{cdn}(k)\tilde{\underline{u}}_{ap}(k)p(k) + \underline{n}_{dn}(k)$$

C. Uplink Steered Reference—Spatial Multiplexing Mode

For the spatial multiplexing mode, the uplink steered reference transmitted on the m-th wideband eigenmode by the user terminal may be expressed as:

$$\underline{x}_{up,sr,m}(k) = \hat{\underline{K}}_{ut}(k)\hat{\underline{v}}_{ut,m}(k)p(k), \text{ for } k \in K. \quad \text{Eq (18)}$$

The vector $\hat{\underline{v}}_{ut,m}(k)$ is the m-th column of the matrix $\hat{V}_{ut}(k)$, where $\hat{V}_{ut}(k) = [\hat{\underline{v}}_{ut,1}(k)\ \hat{\underline{v}}_{ut,2}(k) \ldots \hat{\underline{v}}_{ut,N_{ut}}(k)]$.

The received uplink steered reference at the access point for the spatial multiplexing mode may be expressed as:

$$\underline{r}_{up,sr,m}(k) = \underline{H}_{up}(k)\underline{x}_{up,sr,m}(k) + \underline{n}_{up}(k), \text{ for } k \in K. \quad \text{Eq (19)}$$

$$\approx \hat{\underline{u}}_{up,m}(k)\sigma_m(k)p(k) + \underline{n}_{up}(k)$$

D. Uplink Steered Reference—Beam-Steering Mode

For the beam-steering mode, the uplink steered reference transmitted on the principal wideband eigenmode by the user terminal may be expressed as:

$$\tilde{\underline{x}}_{up,sr}(k) = \hat{\underline{K}}_{ut}(k)\tilde{\underline{v}}_{ut}(k)p(k), \text{ for } k \in K. \quad \text{Eq (20)}$$

The normalized eigenvector $\tilde{v}_{ut}(k)$ for the k-th subband for the principal wideband eigenmode may be expressed as:

$$\underline{\tilde{v}}_{ut}(k)=[Ae^{j\theta_{v1}(k)}\ Ae^{j\theta_{v2}(k)}\ldots Ae^{j\theta_{vN_{ut}}(k)}]^T, \text{Eq (21)}$$

where $$\theta_{vi}(k) = \angle \hat{v}^*_{ut,1,i}(k) = \tan^{-1}\left(\frac{\text{Im}\{\hat{v}_{ut,1,i}(k)\}}{\text{Re}\{\hat{v}_{ut,1,i}(k)\}}\right). \quad \text{Eq (22)}$$

As shown in equation (22), the phase of each element in the vector $\tilde{v}_{ut}(k)$ is obtained from the corresponding element of the eigenvector $\hat{v}_{ut,1}(k)$.

The received uplink steered reference at the access point for the beam-steering mode may be expressed as:

$$\underline{\tilde{r}}_{up,sr}(k) = \underline{H}_{up}(k)\underline{\tilde{x}}_{up,sr}(k) + \underline{n}_{up}(k), \text{ for } k \in K. \quad \text{Eq (23)}$$

$$\approx H_{cup}(k)\underline{\tilde{v}}_{ut}(k)p(k) + \underline{n}_{up}(k)$$

Table 8 summarizes the spatial processing at the access point and user terminal for the steered reference for the spatial multiplexing and beam-steering modes.

TABLE 8

Spatial Processing for Steered Reference

| | Spatial Multiplexing Mode | Beam-Steering Mode |
|---|---|---|
| Access Point | $x_{dn,sr,m}(k) = \hat{K}_{ap}(k)\hat{u}^*_{ap,m}(k)p(k)$ | $\tilde{x}_{dn,sr}(k) = \hat{K}_{ap}(k)\tilde{u}_{ap}(k)p(k)$ |
| User Terminal | $x_{up,sr,m}(k) = \hat{K}_{ut}(k)\hat{v}_{ut,m}(k)p(k)$ | $\tilde{x}_{up,sr}(k) = \hat{K}_{ut}(k)\tilde{v}_{ut}(k)p(k)$ |

E. Steered Reference Transmission

For the exemplary frame structure shown in FIG. 2, the steered reference may be transmitted in the preamble or pilot portion of an FCH PDU (for the downlink) or an RCH PDU (for the uplink). The steered reference may be transmitted in various manners.

In one embodiment, for the spatial multiplexing mode, the steered reference is transmitted for one or more wideband eigenmodes for each TDD frame. The specific number of wideband eigenmodes to transmit in each TDD frame may be dependent on the duration of the steered reference. Table 9 lists the wideband eigenmodes used for the steered reference in the preamble of an FCH/RCH PDU for various preamble sizes, for an exemplary design with four transmit antennas.

TABLE 9

| Preamble Size | Wideband Eigenmodes Used |
|---|---|
| 0 OFDM symbol | no preamble |
| 1 OFDM symbol | wideband eigenmode m, where m = frame counter mod 4 |
| 4 OFDM symbols | cycle through all 4 wideband eigenmodes in the preamble |
| 8 OFDM symbols | cycle through all 4 wideband eigenmodes twice in the preamble |

As shown in Table 9, the steered reference is transmitted for all four wideband eigenmodes within the same TDD frame when the preamble size is four or eight symbol periods.

The steered reference transmitted in the preamble of an FCH PDU by the access point for the n-th symbol period may be expressed as:

$$\underline{x}_{dn,sr,n}(k)=\hat{K}_{ap}(k)\hat{\underline{u}}_{ap,[(n-1)\text{mod }4]+1}(k)p(k), \text{ for } k\in K \text{ and}$$
$$n\in\{1\ldots L\}, \quad \text{Eq (24)}$$

where L is the preamble size (e.g., L=0, 1, 4, or 8 for the exemplary design shown in Table 9).

The steered reference transmitted in the preamble of an RCH PDU by the user terminal for the n-th symbol period may be expressed as:

$$\underline{x}_{up,sr,n}(k)=\hat{K}_{ut}(k)\hat{v}_{ut,[(n-1)\text{ mod }4]+1}(k)p(k), \text{ for } k\in K \text{ and}$$
$$n\in\{1\ldots L\}. \quad \text{Eq (25)}$$

In equations (24) and (25), the four wideband eigenmodes are cycled through in each 4-symbol period by the "mod" operation for the steering vector. This scheme may be used if the channel changes more rapidly and/or during the early part of a communication session when a good channel estimate needs to be obtained quickly for proper system operation.

In another embodiment, the steered reference is transmitted for one wideband eigenmode for each TDD frame. The steered reference for four wideband eigenmodes may be cycled through in four TDD frames. For example, the steering vectors $\hat{v}_{ut,1}(k)$, $\hat{v}_{ut,2}(k)$, $\hat{v}_{ut,3}(k)$, and $\hat{v}_{ut,4}(k)$ may be used for four consecutive TDD frames by the user terminal. The particular steering vector to use for the steered reference in each TDD frame may be specified by a frame counter, which may be sent in the BCH message. This scheme may allow a shorter preamble to be used for the FCH and RCH PDUs. However, a longer time period may be needed to obtain a good estimate of the channel.

For the beam-steering mode, the normalized steering vector for the principal wideband eigenmode is used for the steered reference, as shown in equations (14) and (20). The duration of the steered reference may be selected, for example, based on the channel conditions.

While operating in the beam-steering mode, the user terminal may transmit multiple symbols of steered reference, for example, one or more symbols using the normalized eigenvector $\tilde{v}_{ut}(k)$, one or more symbols using the eigenvector $\hat{v}_{ut,1}(k)$ for the principal eigenmode, and possibly one or more symbols using the eigenvectors for the other eigenmodes. The steered reference symbols generated with $\tilde{v}_{ut}(k)$ may be used by the access point to derive an uplink matched filter vector. This vector is used by the access point to perform matched filtering of the uplink data transmission sent by the user terminal using beam-steering. The steered reference symbols generated with $\hat{v}_{ut,1}(k)$ may be used to obtain $\hat{u}_{ap,1}(k)$, which may then be used to derive the normalized eigenvector $\tilde{u}_{ap}(k)$ that is used for beam-steering on the downlink. The steered reference symbols generated with the eigenvectors $\hat{v}_{ut,2}(k)$ through $\hat{v}_{ut,N_S}(k)$ for the other eigenmodes may be used by the access point to obtain $\hat{u}_{ap,2}(k)$ through $\hat{u}_{ap,N_S}(k)$ and the singular value estimates for these other eigenmodes. This information may then be used by the access point to determine whether to use the spatial multiplexing mode or the beam-steering mode for downlink data transmission.

For the downlink, the user terminal may derive a downlink matched filter vector for the beam-steering mode based on the calibrated downlink channel response estimate $\hat{H}_{cdn}(k)$. In particular, the user terminal has $\hat{u}_{ap,1}^*(k)$ from the singular value decomposition of $\hat{H}_{cdn}(k)$ and can then derive the normalized eigenvector $\tilde{u}_{ap}(k)$. The user terminal can then multiply $\tilde{u}_{ap}(k)$ with $\hat{H}_{cdn}(k)$ to obtain $\hat{H}_{cdn}(k)\tilde{u}_{ap}(k)$, and may then derive the downlink matched filter vector for the beam-steering mode based on $\hat{H}_{cdn}(k)\tilde{u}_{ap}(k)$. Alternatively, a steered reference may be sent by the access point using the normalized eigenvector $\hat{\underline{u}}_{ap}(k)$, and this steered reference may be processed by the user terminal in the manner described above to obtain the downlink matched filter vector for the beam-steering mode.

F. Subband Multiplexing for Steered Reference

For both the spatial multiplexing and beam-steering modes, the steered reference may also be transmitted for multiple wideband eigenmodes for a given symbol period using subband multiplexing. The usable subbands may be partitioned into multiple disjoint sets of subbands, one set for each wideband eigenmode selected for steered reference transmission. Each set of subbands may then be used to transmit a steered reference for the associated wideband eigenmode. For simplicity, the term "wideband eigenmode" is used here even though the steered reference is sent on only a subset of all usable subbands.

For example, the steered reference may be transmitted on all four wideband eigenmodes in one symbol period. In this case, the 52 usable subbands may be partitioned into four disjoint sets (e.g., labeled as sets 1, 2, 3, and 4), with each set including 13 subbands. The 13 subbands in each set may be uniformly distributed across 52 usable subbands. The steered reference for the principal wideband eigenmode may then be transmitted on the 13 subbands in set 1, steered reference for the second wideband eigenmode may be transmitted on the 13 subbands in set 2, steered reference for the third wideband eigenmode may be transmitted on the 13 subbands in set 3, and steered reference for the fourth wideband eigenmode may be transmitted on the 13 subbands in set 4.

If the steered reference is sent on only a subset of all usable subbands for a given wideband eigenmode, then interpolation or some other technique may be used to obtain estimates for the subbands not used for steered reference transmission for that wideband eigenmode.

In general, the multiple sets of subbands may include the same or different number of subbands. For example, the number of subbands to include in each set may be dependent on the SNR of the wideband eigenmode associated with the set (e.g., more subbands may be assigned to a set associated with a poor quality wideband eigenmode). Moreover, the subbands in each set may be uniformly or non-uniformly distributed across the usable subbands. The multiple sets of subbands may also be associated with the same or different sets of pilot symbols.

Subband multiplexing may be used to reduce the amount of overhead needed to transmit the steered reference, which can improve the efficiency of the system.

G. Channel Estimation with the Steered Reference

As shown in equation (13), at the user terminal, the received downlink steered reference for the spatial multiplexing mode (in the absence of noise) is approximately $\hat{v}_{ut,m}^*(k)\sigma_m(k)p(k)$. Similarly, as shown in equation (19), at the access point, the received uplink steered reference for the spatial multiplexing mode (in the absence of noise) is approximately $\hat{\underline{u}}_{ap,m}(k)\sigma_m(k)p(k)$. The access point can thus obtain an estimate of $\hat{\underline{u}}_{ap,m}(k)$ and $\sigma_m(k)$ based on a steered reference sent by the user terminal, and vice versa.

Various techniques may be used to process a steered reference. For clarity, the following description is for the processing of an uplink steered reference. The received vector at the access point is given in equation (19), which is $\underline{r}_{up,sr,m}(k) \approx \hat{\underline{u}}_{ap,m}(k)\sigma_m(k)p(k) + \underline{n}_{up}(k)$.

In one embodiment, to obtain an estimate of $\hat{\underline{u}}_{ap,m}(k)$, the received vector $\underline{r}_{up,sr,m}(k)$ for the steered reference sent on the m-th wideband eigenmode is first multiplied with the complex conjugate of the pilot symbol, $p^*(k)$, that is used for the steered reference. The result may then be integrated over multiple received steered reference symbols for each wideband eigenmode to obtain an estimate of $\hat{\underline{u}}_{ap,m}(k)\sigma_m(k)$, which is a scaled left eigenvector of $\hat{H}_{cup}(k)$ for the m-th wideband eigenmode. Each of the $N_{ap}$ entries of the vector $\hat{\underline{u}}_{ap,m}(k)$ is obtained based on a corresponding one of the $N_{ap}$ entries for the vector $\underline{r}_{up,m}(k)$, where the $N_{ap}$ entries of $\underline{r}_{up,m}(k)$ are the symbols received from the $N_{ap}$ antennas at the access point. Since eigenvectors have unit power, the singular value $\sigma_m(k)$ may be estimated based on the received power of the steered reference, which can be measured for each subband of each wideband eigenmode. The singular value estimate $\hat{\sigma}_m(k)$ is then equal to the square root of the received power divided by the magnitude of the pilot symbol p(k).

In another embodiment, a minimum mean square error (MMSE) technique is used to obtain an estimate of the vector $\hat{\underline{u}}_{ap,m}(k)$ based on the received vector $\underline{r}_{up,sr,m}(k)$ for the steered reference. Since the pilot symbols p(k) are known, the access point can derive an estimate of $\hat{\underline{u}}_{ap,m}(k)$ such that the mean square error between the received pilot symbols (obtained after performing the matched filtering on the received vector $\underline{r}_{up,sr,m}(k)$) and the transmitted pilot symbols is minimized. The use of the MMSE technique for spatial processing at the receiver is described in commonly assigned U.S. patent application Ser. No. 09/993,087, entitled "Multiple-Access Multiple-Input Multiple-Output (MIMO) Communication System," filed Nov. 6, 2001.

The steered reference is sent for one wideband eigenmode in any given symbol period (without subband multiplexing), and may in turn be used to obtain an estimate of one eigenvector for each subband of that wideband eigenmode. Thus, the receiver is able to obtain an estimate of only one eigenvector in a unitary matrix for any given symbol period. Since estimates of multiple eigenvectors for the unitary matrix are obtained over different symbol periods, and due to noise and other sources of degradation in the wireless channel, the estimated eigenvectors for the unitary matrix (which are individually derived) are not likely be orthogonal to one another. The estimated eigenvectors may thereafter be used for matched filtering of a data transmission received on the same link and/or spatial processing of a data transmission sent on the other link. In this case, any errors in orthogonality among these estimated eigenvectors would result in cross-talk among the data streams sent on the eigenmodes corresponding to the eigenvectors. The cross-talk may degrade performance.

In an embodiment, the estimated eigenvectors for each unitary matrix are forced to be orthogonal to each other. The orthogonalization of the eigenvectors may be achieved using the Gram-Schmidt technique, which is described in detail in the aforementioned reference from Gilbert Strang, or some other technique.

Other techniques to process the steered reference may also be used, and this is within the scope of the invention.

The access point can thus estimate both $\hat{U}_{ap}(k)$ and $\hat{\Sigma}(k)$ based on the steered reference sent by the user terminal, without having to estimate the uplink channel response or perform singular value decomposition of $\hat{H}_{cup}(k)$.

The processing at the user terminal to estimate the matrices $\hat{V}_{ut}(k)$ and $\hat{\Sigma}(k)$, for k∈K, based on the downlink steered reference may be performed similar to that described above for the uplink steered reference.

For the beam-steering mode, on the uplink, the received vector $\tilde{\underline{r}}_{up,sr,m}(k)$ for the steered reference may be processed by the access point in a similar manner to obtain an estimate of $H_{cup}(k)\tilde{v}_{ut}(k)$. The conjugate transpose of this estimate is then the matched filter for the uplink transmission in the beam-steering mode. On the downlink, the received vector $\tilde{r}_{dn,sr,m}(k)$ for the steered reference may be processed by the user terminal in a similar manner to obtain an estimate of $H_{cdn}(k)\tilde{u}_{ap}(k)$. The conjugate transpose of this estimate is then the matched filter for the downlink transmission in the beam-steering mode.

5. Carrier Pilot

The carrier pilot may be transmitted on the pilot subbands in various manners for the TDD frame structure shown in FIG. 2. In one embodiment, the four pilot sequences are reset for each transport channel. Thus, on the downlink, the pilot sequences are reset for the first OFDM symbol of the BCH message, reset again for the first OFDM symbol of the FCCH message, and reset for the first OFDM symbol sent on the FCH. In another embodiment, the pilot sequences are reset at the start of each TDD frame and repeated as often as needed. For this embodiment, the pilot sequences may be stalled during the preamble portions of the BCH and FCH. The carrier pilot may also be transmitted in other manners, and this is within the scope of the invention.

6. Pilot Transmission Scheme

Figure 3:
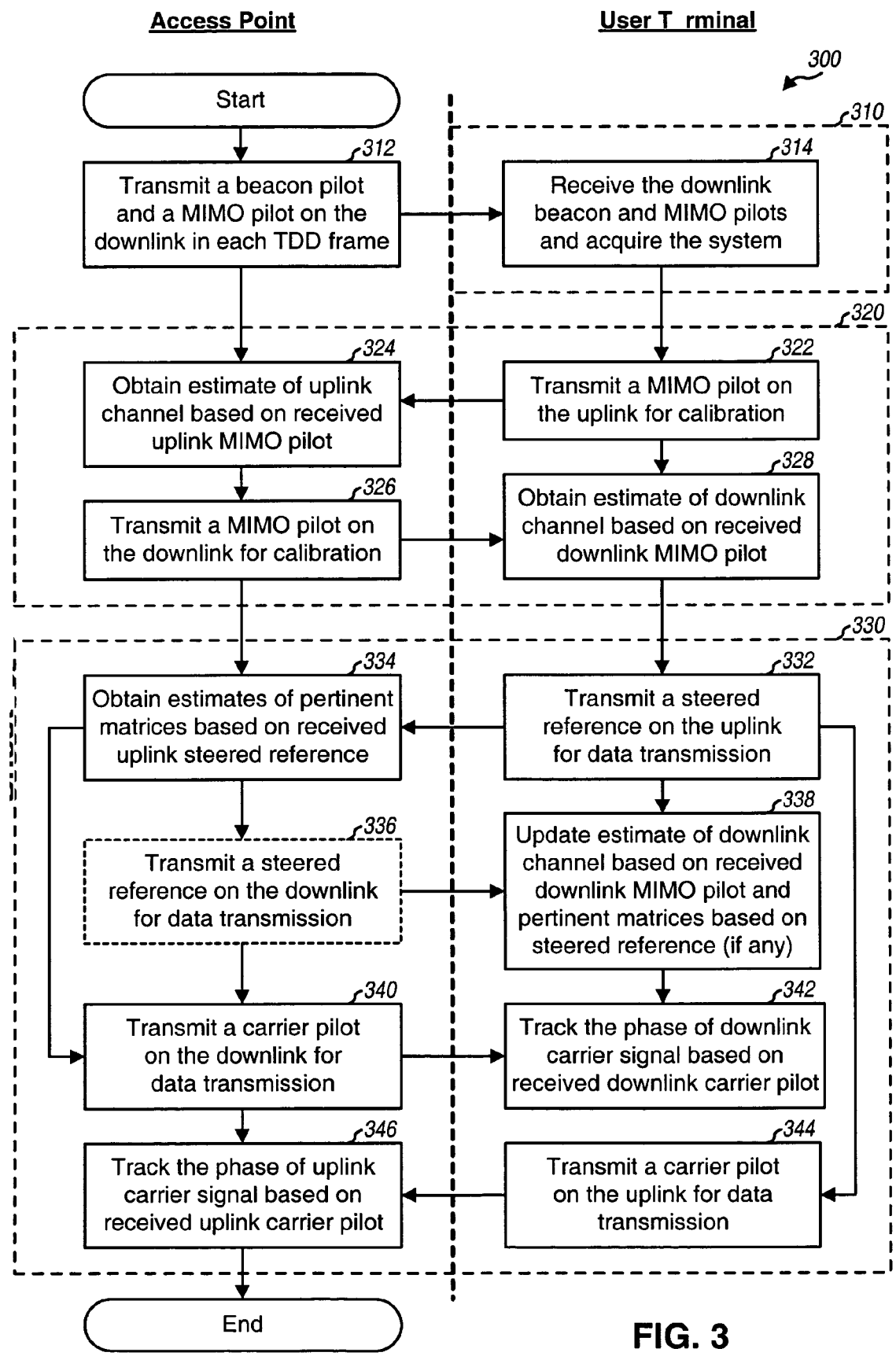
FIG. 3 shows downlink and uplink pilot transmissions for an exemplary pilot transmission scheme.

Four types of pilot have been described above and may be used for MIMO and MIMO-OFDM systems. These four different types of pilot may be transmitted in various manners. FIG. 3 shows downlink and uplink pilot transmissions for an exemplary pilot transmission scheme. Generally, block 310 corresponds to a system access phase, block 320 corresponds to a calibration phase, and block 330 corresponds to a normal operation phase.

A beacon pilot and a MIMO pilot are transmitted on the downlink by the access point in each TDD frame (block 312) to allow all user terminals in the system to acquire the system frequency and timing and to estimate the downlink channel (block 314). Block 314 may be performed as necessary to access the system.

Calibration may be performed prior to normal operation to calibrate out differences in the transmit/receive chains at the access point and user terminal. For the calibration, MIMO pilots may be transmitted by both the access point and the user terminal (blocks 322 and 326). The uplink MIMO pilot may be used by the access point to derive an estimate of the uplink channel (block 324), and the downlink MIMO pilot may be used by the user terminal to derive or update an estimate of the downlink channel (block 328). The downlink and uplink channel estimates are then used to derive the correction factors for the access point and the user terminal.

During normal operation, a steered reference may be transmitted on the uplink by the user terminal (1) if and when it desires a data transmission or (2) if it is scheduled for data transmission (block 332). The uplink steered reference may be used by the access point to estimate the pertinent unitary and diagonal matrices for the user terminal (block 334). A steered reference may optionally be transmitted by the access point to the user terminal (as shown by dashed block 336). The user terminal can continually update its estimate of the downlink channel based on the downlink MIMO pilot and update the pertinent unitary and diagonal matrices based on the downlink steered reference (if transmitted) (block 338). Carrier pilots are transmitted by the access point (block 340) and the user terminal (block 344) on the pilot subbands during portions that are not used for other pilots. The downlink carrier pilot is used by the user terminal to track the phase of the downlink carrier signal (block 342), and the uplink carrier pilot is used by the access point to track the phase of the uplink carrier signal (block 346).

For the pilot transmission scheme shown in FIG. 3, the user terminal estimates the downlink channel response based on the downlink MIMO pilot and transmits a steered reference on the uplink, which is then used by the access point to estimate the pertinent unitary and diagonal matrices for the user terminal. In certain instances, the user terminal may have obtained a bad estimate of the downlink channel response, in which case the uplink steered reference may be equally bad or possibly worse. In the worst case, the steering vector used by the user terminal may result in a beam null being pointed at the access point. If this occurs, then the access point would not be able to detect the uplink steered reference. To avoid this situation, the user terminal can perturb the phases of the $N_{ut}$ elements of the steering vector it uses for the steered reference in situations where it detects that the access point is not receiving the steered reference properly. For example, if the user terminal is designated to transmit an uplink steered reference as part of a system access procedure, and if access to the system is not gained after a particular number of access attempts, then the user terminal can start to perturb the phases of the steering vector elements.

Various other pilot transmission schemes may also be implemented for MIMO and MIMO-OFDM systems, and this is within the scope of the invention. For example, the beacon and carrier pilots may be combined into a single pilot that can be used for frequency and timing acquisition and carrier phase tracking. As another example, the active user terminals may transmit MIMO pilots, instead of steered references, on the uplink.

IV. MIMO-OFDM System

Figure 4:
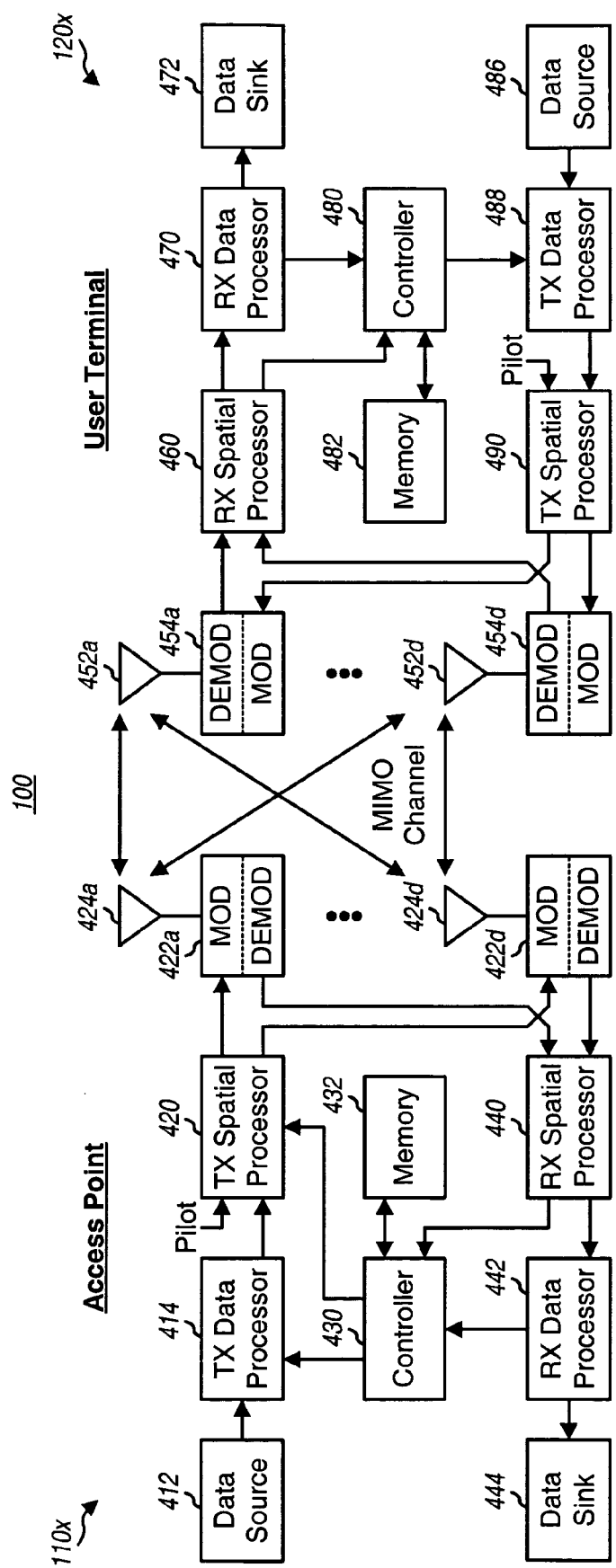
FIG. 4 shows a block diagram of an access point and a user terminal.

FIG. 4 shows a block diagram of an embodiment of an access point 110x and a user terminal 120x in MIMO-OFDM system 100. For clarity, in this embodiment, access point 110x is equipped with four antennas that can be used for data transmission and reception, and user terminal 120x is also equipped with four antennas for data transmission/reception. In general, the access point and user terminal may each be equipped with any number of transmit antennas and any number of receive antennas.

On the downlink, at access point 110x, a transmit (TX) data processor 414 receives traffic data from a data source 412 and signaling and other data from a controller 430. TX data processor 414 formats, codes, interleaves, and modulates (i.e., symbol maps) the data to provide modulation symbols. A TX spatial processor 420 receives and multiplexes the modulation symbols from TX data processor 414 with pilot symbols, performs the required spatial processing, and provides four streams of transmit symbols for the four transmit antennas.

Each modulator (MOD) 422 receives and processes a respective transmit symbol stream to provide a corresponding downlink modulated signal. The four downlink modulated signals from modulators 422a through 422d are then transmitted from antennas 424a through 424d, respectively.

At user terminal 120x, four antennas 452a through 452d receive the transmitted downlink modulated signals, and each antenna provides a received signal to a respective demodulator (DEMOD) 454. Each demodulator 454 performs processing complementary to that performed at modulator 422 and provides received symbols. A receive (RX) spatial processor 460 then performs spatial processing on the received symbols from all demodulators 454a through 454d to provide recovered symbols, which are estimates of the modulation symbols transmitted by the access point. An RX data processor 470 further processes (e.g., symbol demaps, deinterleaves, and decodes) the recovered symbols to provide decoded data, which may be provided to a data sink 472 for storage and/or a controller 480 for further processing.

The processing for the uplink may be the same or different from the processing for the downlink. Data and signaling are processed (e.g., coded, interleaved, and modulated) by a TX data processor 488, multiplexed with pilot symbols, and further spatially processed by a TX spatial processor 490. The transmit symbols from TX spatial processor 490 are further processed by modulators 454a through 454d to generate four uplink modulated signals, which are then transmitted via antennas 452a through 452d.

At access point 410, the uplink modulated signals are received by antennas 424a through 424d, demodulated by demodulators 422a through 422d, and processed by an RX spatial processor 440 and an RX data processor 442 in a complementary manner to that performed at the user terminal. The decoded data for the uplink may be provided to a data sink 444 for storage and/or controller 430 for further processing.

Controllers 430 and 480 control the operation of various processing units at the access point and user terminal, respectively. Memory units 432 and 482 store data and program codes used by controllers 430 and 480, respectively.

Figure 5:
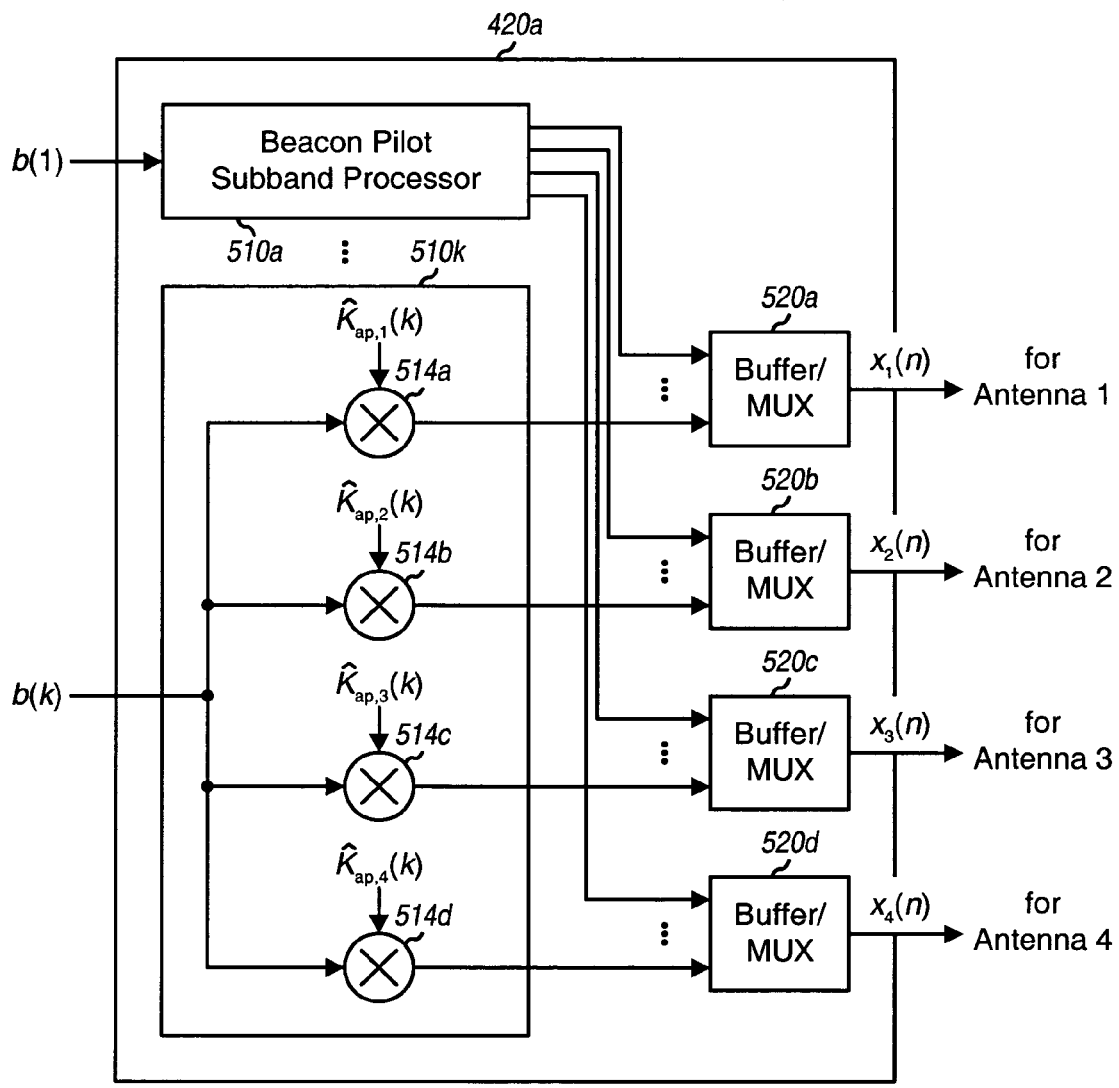
FIG. 5 shows a block diagram of a TX spatial processor that can generate a beacon pilot.

FIG. 5 shows a block diagram of a TX spatial processor 420a that can generate a beacon pilot and which may be implemented within TX spatial processor 420 in FIG. 4. Processor 420a includes a number of beacon pilot subband processors 510a through 510k, one for each subband used to transmit the beacon pilot. Each subband processor 510 receives a pilot symbol b(k) for the beacon pilot and a correction matrix $\hat{K}_{ap}(k)$ for the associated subband.

Within each subband processor 510, the pilot symbol b(k) is scaled by four multipliers 514a through 514d with four correction factors $\hat{K}_{ap,1}(k)$ through $\hat{K}_{ap,4}(k)$, respectively, from the matrix $\hat{K}_{ap}(k)$. Each multiplier 514 performs complex multiplication of the complex pilot symbol with a respective complex correction factor. The scaled pilot symbols from multipliers 514a through 514d are then provided to four buffers/multiplexers 520a through 520d, respectively, which also receive the scaled pilot symbols from other subband processors 510. Each buffer/multiplexer 520 multiplexes the scaled pilot symbols for all subbands used for beacon pilot transmission and signal values of zero for the unused subbands and provides a stream of transmit symbols for the associated transmit antenna.

Figure 6A:
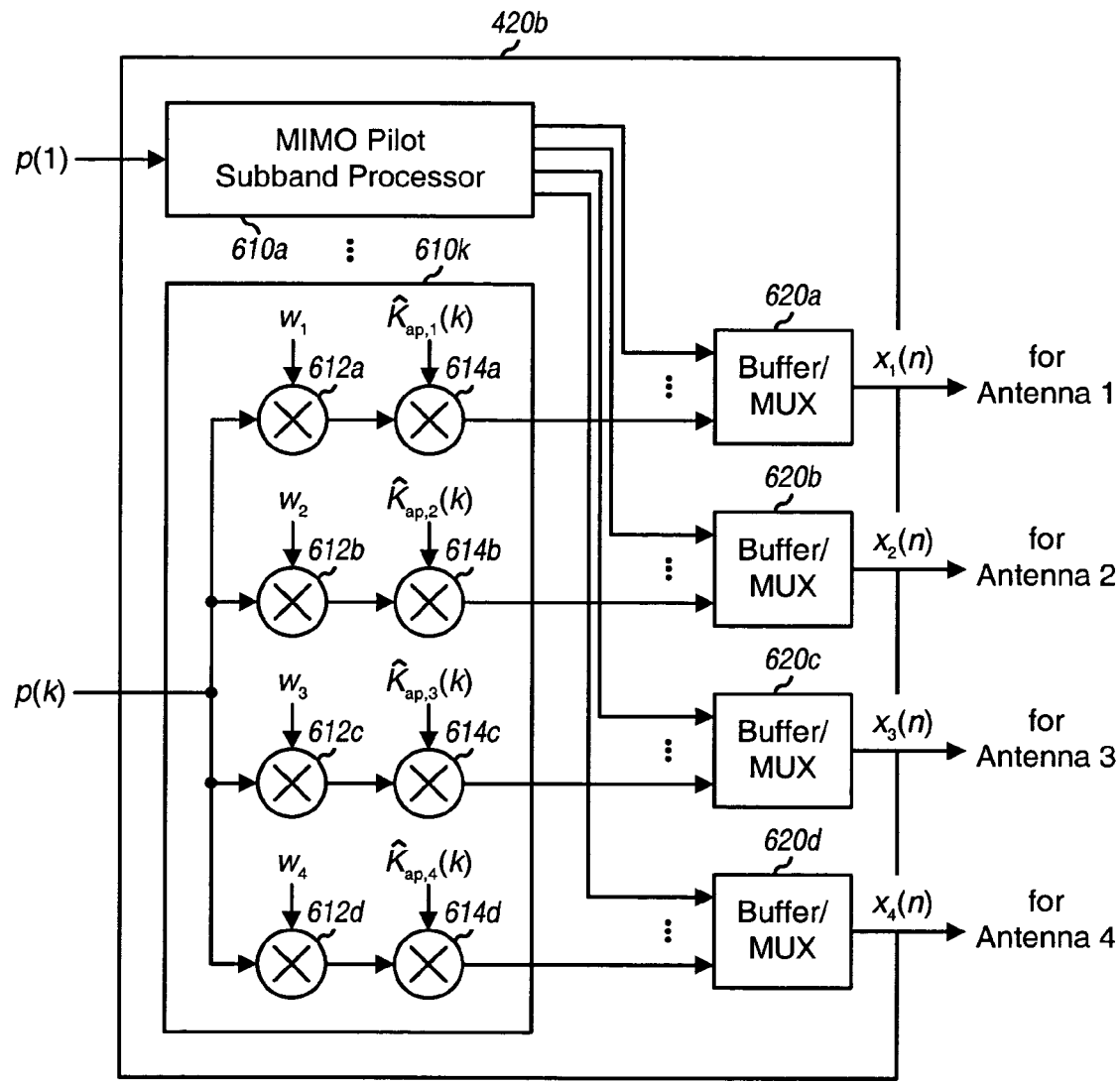
FIG. 6A shows a block diagram of a TX spatial processor that can generate a MIMO pilot.

FIG. 6A shows a block diagram of a TX spatial processor 420b that can generate a MIMO pilot. Processor 420b may be implemented within TX spatial processor 420 or 490 in FIG. 4, but for clarity is described below for an implementation in TX spatial processor 420. Processor 420b includes a number of MIMO pilot subband processors 610a through 610k, one for each subband used to transmit the MIMO pilot. Each subband processor 610 receives a pilot symbol p(k) for the MIMO pilot and a correction matrix $\hat{K}_{ap}(k)$ for the associated subband. Each subband processor 610 also receives four Walsh sequences, $w_1$ through $w_4$, assigned to the four transmit antennas at the access point.

Within each subband processor 610, the complex pilot symbol p(k) is covered by the four Walsh sequences $w_1$ through $w_4$ by four complex multipliers 612a through 612d, respectively. The covered pilot symbols are further scaled by four complex multipliers 614a through 614d with four complex correction factors $\hat{K}_{ap,1}(k)$ through $\hat{K}_{ap,4}(k)$, respectively, from the matrix $\hat{K}_{ap}(k)$. The scaled pilot symbols from multipliers 614a through 614d are then provided to four buffers/multiplexers 620a through 620d, respectively. The subsequent processing is as described above for FIG. 5.

For an implementation of processor 420b in TX spatial processor 490, the number of Walsh sequences to use is dependent on the number of transmit antennas available at the user terminal. Moreover, the scaling is performed with the correction factors from the matrix $\hat{K}_{ut}(k)$ for the user terminal.

Figure 6B:
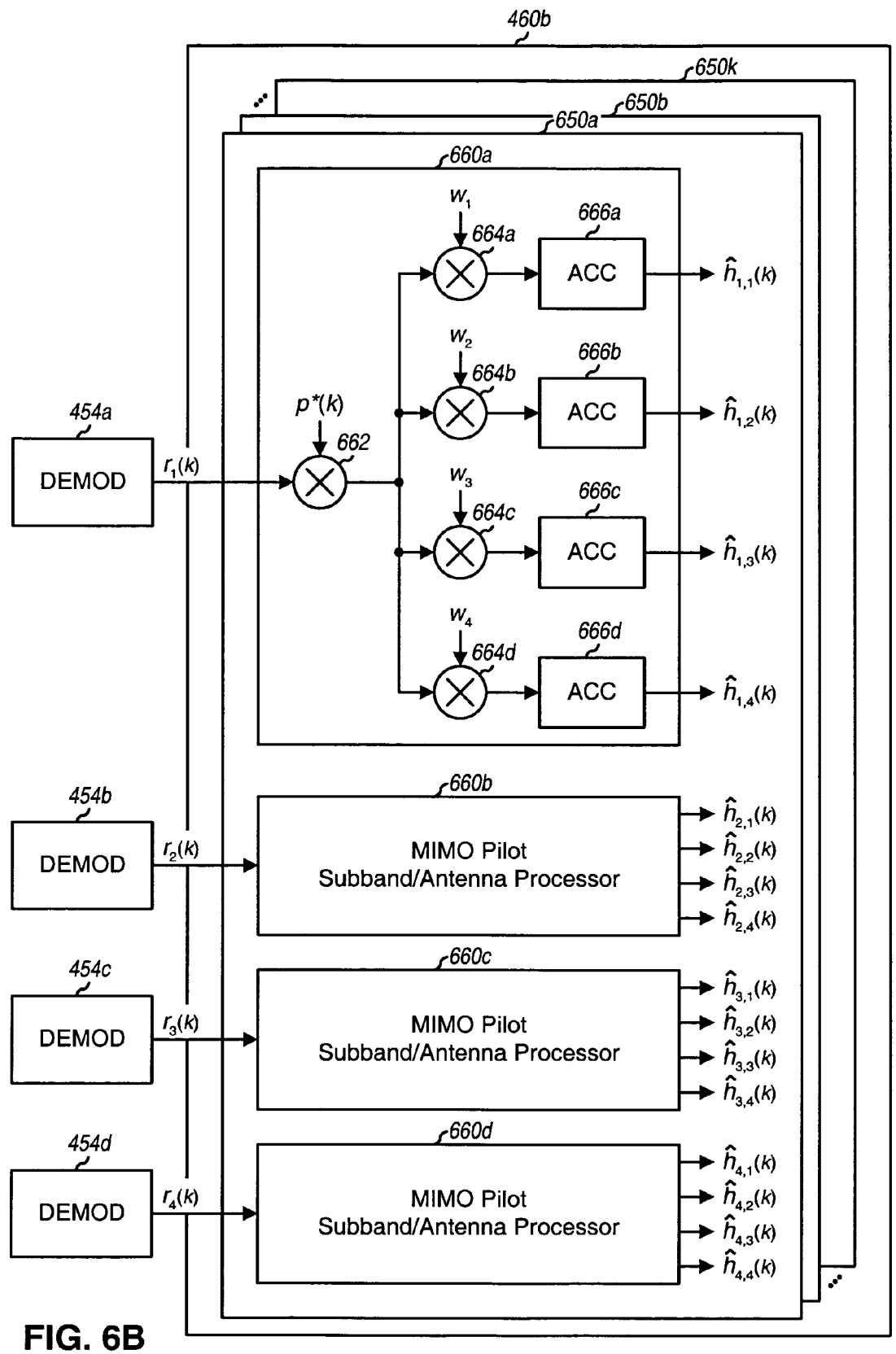
FIG. 6B shows a block diagram of an RX spatial processor that can provide a channel response estimate based on a received MIMO pilot.

FIG. 6B shows a block diagram of an RX spatial processor 460b that can provide a channel response estimate based on a received MIMO pilot. Processor 460b may be implemented within RX spatial processor 440 or 460 in FIG. 4, but for clarity is described below for an implementation in RX spatial processor 460. Processor 460b includes a number of MIMO pilot subband processors 650a through 650k, one for each subband used for MIMO pilot transmission. Each MIMO pilot subband processor 650 receives a vector r(k) and a conjugated pilot symbol p*(k) for the associated subband. Each subband processor 650 also receives the four Walsh sequences $w_1$ through $w_4$ assigned to the four transmit antennas at the access point.

Each MIMO pilot subband processor 650 includes four MIMO pilot subband/antenna processors 660a through 660d for the four receive antennas at the user terminal. Each processor 660 receives one entry $r_i(k)$ of the vector r(k). Within each processor 660, the received symbol $r_i(k)$ is first multiplied with the conjugated pilot symbol p*(k) by a complex multiplier 662. The output of multiplier 662 is further multiplied with the four Walsh sequences $w_1$ through $W_4$ by four complex multipliers 664a through 664d, respectively. The outputs from multipliers 664a through 664d are then accumulated by accumulators 666a through 666d, respectively, for the duration of the MIMO pilot transmission. Each pair of multiplier 664 and accumulator 666 performs decovering for one transmit antenna at the access point. The output from each accumulator 666 represents an estimate $\hat{h}_{i,j}(k)$ of the channel gain from transmit antenna j to receive antenna i for subband k. The channel response estimates $\{\hat{h}_{i,j}(k)\}$, for i={1, 2, 3, 4} and j={1, 2, 3, 4}, may further be averaged over multiple MIMO pilot transmissions (not shown in FIG. 6B) to provide a more accurate estimate of the channel response.

As shown in FIG. 6B, each MIMO pilot subband/antenna processor 660 provides a row vector $\hat{h}_{cdn,i}(k)=[\hat{h}_{i,1}(k)\ \hat{h}_{i,2}(k)\ \hat{h}_{i,3}(k)\ \hat{h}_{i,4}(k)]$ for the associated receive antenna i, where $\hat{h}_{cdn,i}(k)$ is the i-th row of the calibrated channel response estimate $\hat{H}_{cdn}(k)$ for the downlink (assuming that the access point applied its correction matrix $\hat{K}_{ap}(k)$). Processors 660a through 660d collectively provide the four rows of the calibrated channel response matrix $\hat{H}_{cdn}(k)$.

Figure 7A:
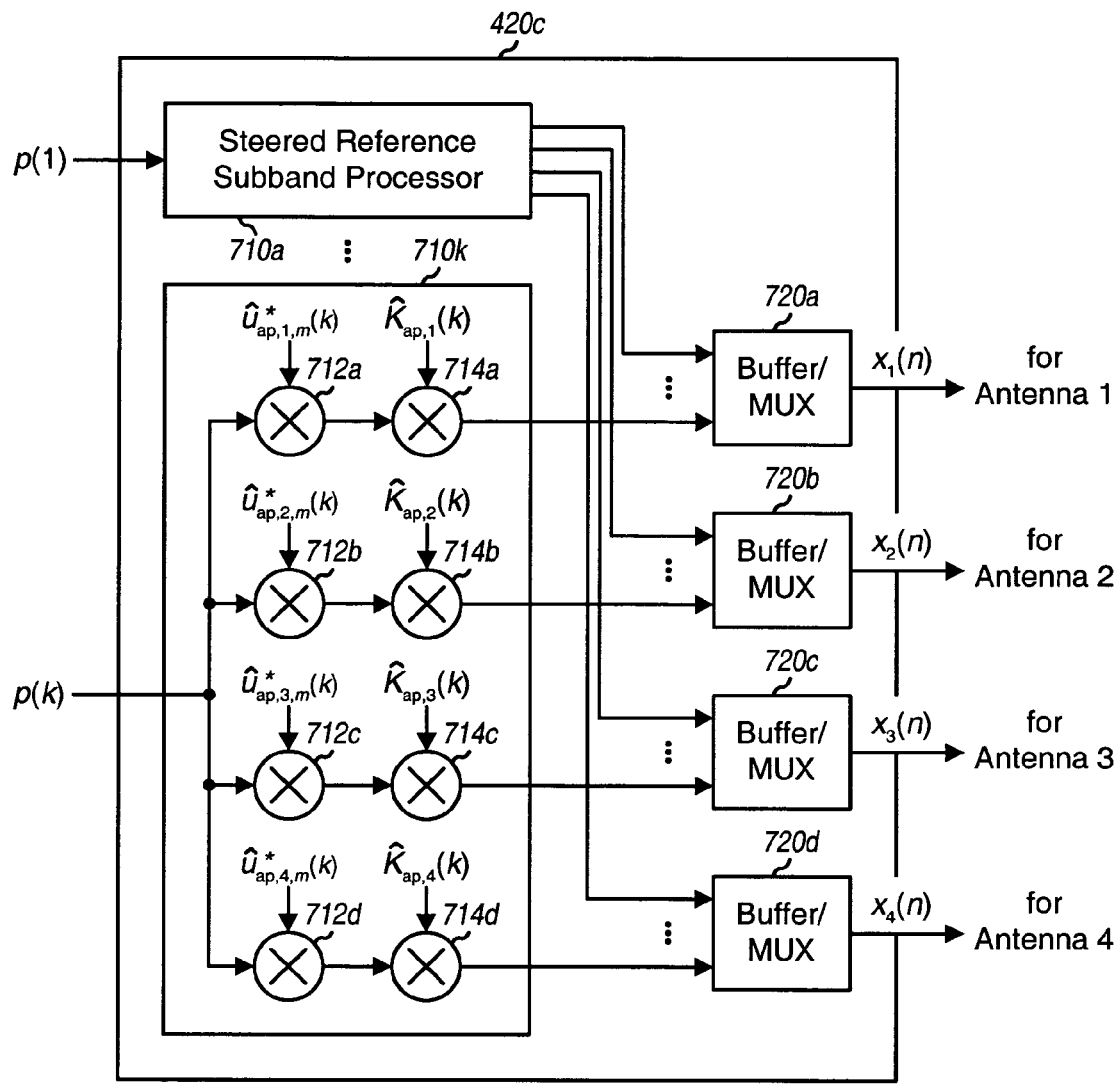
FIG. 7A shows a block diagram of a TX spatial processor that can generate a steered reference.

FIG. 7A shows a block diagram of a TX spatial processor 420c that can generate a steered reference. Processor 420c may also be implemented within TX spatial processor 420 or 490 in FIG. 4, but for clarity is described below for an implementation in TX spatial processor 420. Processor 420c includes a number of steered reference subband processors 710a through 710k, one for each subband used to transmit the steered reference. To generate the steered reference for the spatial multiplexing mode, each subband processor 710 receives a pilot symbol p(k), the steering vector $\hat{u}_{ap,m}^*(k)$ for each wideband eigenmode on which the steered reference is to be transmitted, and a correction matrix $\hat{K}_{ap}(k)$ for the associated subband.

Within each subband processor 710, the pilot symbol p(k) is multiplied with the four elements $\hat{u}_{ap,1,m}^*(k)$ through $\hat{u}_{ap,4,m}^*(k)$ of the steering vector $\hat{u}_{ap,m}^*(k)$ for the m-th wideband eigenmode by four complex multipliers 712a through 712d, respectively. The outputs from multipliers 712a through 712d are further scaled by four complex multipliers 714a through 714d with four correction factors $\hat{K}_{ap,1}(k)$ through $\hat{K}_{ap,4}(k)$, respectively, from the matrix $\hat{K}_{ap}(k)$. The scaled pilot symbols from multipliers 714a through 714d are then provided to four buffers/multiplexers 720a through 720d, respectively. The subsequent processing is as described above.

To generate the steered reference on the downlink for the beam-steering mode, each subband processor 710 would receive a normalized steering vector $\tilde{u}_{ap}(k)$, instead of the unnormalized steering vector $\hat{u}_{ap,m}*(k)$. For an implementation of processor 420c in TX spatial processor 490, each subband processor 710 would receive either (1) the steering vector $\hat{v}_{ut,m}(k)$ for each wideband eigenmode used for the steered reference, for the spatial multiplexing mode, or (2) the steering vector $\tilde{v}_{ut}(k)$ for the beam-steering mode. If subband multiplexing is used for the steered reference, then steering vectors for multiple wideband eigenmodes may be used for multiple disjoint sets of subbands, as described above.

Figure 7B:
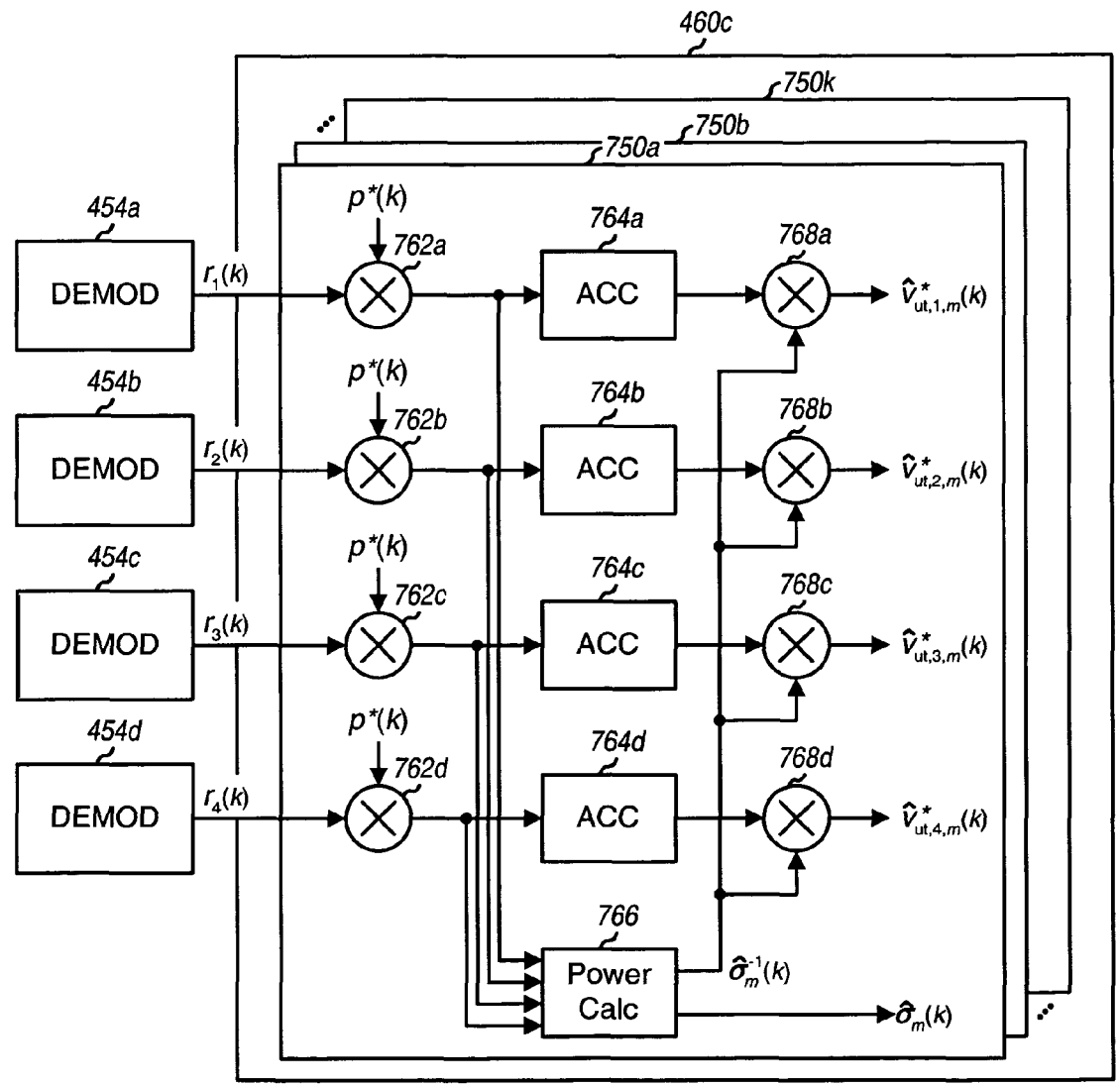
FIG. 7B shows a block diagram of an RX spatial processor that can provide a channel response estimate based on a received steered reference.

FIG. 7B shows a block diagram of an RX spatial processor 460c that can provide estimates of steering vectors and singular values based on a received steered reference. Processor 460c may be implemented within RX spatial processor 440 or 460 in FIG. 4, but for clarity is described below for an implementation in RX spatial processor 460. Processor 460c includes a number of steered reference subband processors 750a through 750k, one for each subband used for steered reference transmission. Each subband processor 750 receives a vector r(k) and a conjugated pilot symbol p*(k) for the associated subband.

Within each subband processor 750, the four symbols in the received vector r(k) are multiplied with the conjugated pilot symbol p*(k) by complex multipliers 762a through 762d, respectively. The outputs of multipliers 762a through 762d are then accumulated for the duration of the steered reference transmission for each wideband eigenmode by accumulators 764a through 764d, respectively. As shown in Table 9, the steered reference may be sent for multiple wideband eigenmodes within the same steered reference transmission, in which case the accumulation is performed separately for each of these wideband eigenmodes. However, multiple steered reference symbols (which may be transmitted in one or multiple steered reference transmissions) for any given wideband eigenmode may be accumulated to obtain a higher quality estimate. Accumulators 764a through 764d provide four elements which are the estimate of $\hat{v}_{ut,m}*(k)\sigma_m(k)$, as shown in equation (13).

Since the eigenvectors have unit power, the singular value $\sigma_m(k)$ for each wideband eigenmode may be estimated based on the received power of the steered reference. A power calculation unit 766 receives the outputs of multipliers 762a through 762d and computes the received power of the steered reference, $P_m(k)$, for each eigenmode of subband k. The singular value estimate $\hat{\sigma}_m(k)$ is then equal to the square root of the computed received power of the steered reference divided by the magnitude of the pilot symbol (i.e., $\hat{\sigma}_m(k) = \sqrt{P_m(k)}/|p(k)|$), where $$P_m(k) = \sum_{i=1}^{N_R} |r_i(k)|^2$$

and $r_i(k)$ is the symbol received on subband k of receive antenna i.

The outputs of accumulators 766a through 766d are then scaled by the inverse of the singular value estimate, $\hat{\sigma}_m^{-1}(k)$, by multipliers 768a through 768d, respectively, to provide an estimate of the steering vector for each eigenmode, $\hat{\underline{v}}_{ut,m}*(k) = [\hat{v}_{ut,1,m}*(k)\ \hat{v}_{ut,2,m}*(k)\ \hat{v}_{ut,3,m}*(k)\ \hat{v}_{ut,4,m}*(k)]$.

The processing for the steered reference for the beam-steering may be performed in a similar manner. The processing for the steered reference on the uplink may also be performed in similar manner to obtain an estimate of the steering vector for each eigenmode, $\hat{\underline{u}}_{ap,m}(k) = [\hat{u}_{ap,1,m}(k)\ \hat{u}_{ap,2,m}(k)\ \hat{u}_{ap,3,m}(k)\ \hat{u}_{ap,4,m}(k)]$.

The pilots described herein may be implemented by various means. For example, the processing for the various types of pilot at the access point and the user terminal may be implemented in hardware, software, or a combination thereof. For a hardware implementation, the elements used to process the pilots for transmission and/or reception may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, some of the processing for the various types of pilot (e.g., the spatial processing for a pilot transmission and/or channel estimation based on the received pilot) may be implemented with modules (e.g., procedures, functions, and so on) that perform the functions described herein. The software codes may be stored in a memory unit (e.g., memory units 432 and 482 in FIG. 4) and executed by a processor (e.g., controllers 430 and 480). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless multiple-input multiple-output (MIMO) communication system utilizing orthogonal frequency division multiplexing (OFDM), a method of generating a MIMO pilot comprised of a plurality of orthogonal pilots suitable for transmission from a plurality of antennas, the method comprising:

obtaining a set of pilot symbols for each antenna in the plurality of antennas, wherein the set of pilot symbols is designated for transmission on a set of subbands and selected to minimize peak-to-average variation in a waveform generated based on the pilot symbols;

obtaining an orthogonal sequence for each antenna in the plurality of antennas, wherein the plurality of antennas are assigned different orthogonal sequences;

covering the set of pilot symbols for each antenna with the orthogonal sequence for the antenna to obtain a set of sequences of covered pilot symbols for the antenna;

processing the set of sequences of covered pilot symbols for each antenna to obtain a sequence of OFDM symbols for the antenna, wherein a plurality of sequences of OFDM symbols for the plurality of orthogonal pilots are obtained for the plurality of antennas; and transmitting the plurality of sequences of OFDM symbols from the plurality of antennas.

2. The method of claim 1, wherein one set of pilot symbols is obtained and used for the plurality of antennas.

3. A computer-program apparatus for generating a MIMO pilot comprised of a plurality of orthogonal pilots suitable for transmission from a plurality of antennas comprising a memory having one or more software modules stored thereon, the one or more software modules being executable by one or more processors and the one or more software modules comprising:

code for obtaining a set of pilot symbols for each antenna in the plurality of antennas, wherein the set of pilot symbols is designated for transmission on a set of subbands and selected to minimize peak-to-average variation in a waveform generated based on the pilot symbols;

code for obtaining an orthogonal sequence for each antenna in the plurality of antennas, wherein the plurality of antennas are assigned different orthogonal sequences;

code for covering the set of pilot symbols for each antenna with the orthogonal sequence for the antenna to obtain a set of sequences of covered pilot symbols for the antenna;

code for processing the set of sequences of covered pilot symbols for each antenna to obtain a sequence of OFDM symbols for the antenna, wherein a plurality of sequences of OFDM symbols for the plurality of orthogonal pilots are obtained for the plurality of antennas; and code for transmitting the plurality of sequences of OFDM symbols from the plurality of antennas.

* * * * *